US008180274B2

(12) United States Patent
Bender

(10) Patent No.: US 8,180,274 B2
(45) Date of Patent: May 15, 2012

(54) SYSTEM FOR MANAGING AND MESSAGING CRITICAL STUDENT INFORMATION

(75) Inventor: T. Gregory Bender, Mount Vernon, NY (US)

(73) Assignee: Message Logix, Inc., a Corporation, White Plains, NY (US)

( * ) Notice: Subject to any disclaimer, the term of this patent is extended or adjusted under 35 U.S.C. 154(b) by 664 days.

(21) Appl. No.: 11/436,143

(22) Filed: May 17, 2006

(65) Prior Publication Data
US 2006/0263757 A1 Nov. 23, 2006

Related U.S. Application Data

(60) Provisional application No. 60/681,854, filed on May 17, 2005.

(51) Int. Cl.
*G09B 3/00* (2006.01)
(52) U.S. Cl. .................. 434/350; 434/336; 434/365
(58) Field of Classification Search .............. 434/350, 434/336, 118, 365
See application file for complete search history.

(56) References Cited

U.S. PATENT DOCUMENTS

| 5,294,229 | A | 3/1994 | Hartzell et al. | |
|---|---|---|---|---|
| 6,816,878 | B1 | 11/2004 | Zimmers et al. | |
| 2002/0182578 | A1* | 12/2002 | Rachman et al. | 434/350 |
| 2004/0110119 | A1* | 6/2004 | Riconda et al. | 434/350 |
| 2004/0258215 | A1 | 12/2004 | DeVito et al. | |
| 2005/0013417 | A1 | 1/2005 | Zimmers et al. | |
| 2005/0091368 | A1 | 4/2005 | Ozburn | |
| 2005/0227218 | A1* | 10/2005 | Mehta et al. | 434/350 |
| 2005/0266388 | A1* | 12/2005 | Gross et al. | 434/350 |

* cited by examiner

*Primary Examiner* — Xuan Thai
*Assistant Examiner* — Banafsheh Hadizonooz
(74) *Attorney, Agent, or Firm* — St. Onge Steward Johnston & Reens LLC

(57) ABSTRACT

A system for managing critical student information is disclosed generally comprising storing information associated with individual students, such as important medical information or contact information for the student's parent or guardian, and providing different authorized users, such as school administrators, teachers, or coaches, permission to access the information and/or send messages for particular students. The stored information for each student is associated with one or more group identifiers, which identify particular groups of which the student is a member, such as a school or team, and each authorized user is likewise associated with one or more group identifiers, which identify the particular groups for which the user has access and can send messages.

30 Claims, 68 Drawing Sheets

Step 1 - Entering in personal information and passwords

Pleasantville School District

Stay informed with Pleasantville's new emergency contact notification list.

The Pleasantville School District is offering its residents and staff the opportunity to be notified by e-mail about school closings, early dismissals, calendar updates, newsletters, budget information and other school - related matters. If you wish to be included on this e-mail list, please fill out and submit this form. Thank you.

*Resident's First Name: [          ] ——————— They enter their information

*Resident's Last Name: [          ]

*Primary Email Address: [gbender@messagelogix.co] ——————— They enter in an emails Secondary Email Address: [          ] (optional)

*Password: [          ] ——————— They enter their password

*Re-Type Password: [          ]

*Contact Type: [Select Contact Type ▼] ——————— They select contact type

Emergency text messages to your cell phone

If you would like to receive emergency text messages to your cell phone email, please enter your 10 digit mobile phone number and select your carrier.

Please note: If you do not have text messaging enabled, please call your cell phone provider to have text messaging enabled.

Mobile Phone # (Only 10 digit numbers, no "-")
[          ] [Select Carrier ▼] ——————— They select cell phone carrier ⊙ I have children in the Pleasantville School District. I would

Fig. 6

Student Medical Examination

Your School/District

Parent Emergency Notification System
Student Emergency and Medical Information Collection

Add Student Medical Examination

* Required

| Field | Value |
|---|---|
| First Name: | Johnny |
| Last Name: | Quest |
| *School: | Middle School |
| *Grade: | 6 |
| *Date: | 3/15/06 |
| *Age: | 12 |
| *Eyes: | Green |
| *Lymph Nodes: | |
| *Thyroid: | |
| *Nose: | |
| *Tonsils: | |
| *Teeth: | |
| *Heart: | high blood pressure |
| *Lungs: | normal |
| *Hernia: | |
| *Genito-Urinary: | |
| *Orthopedic - Structural: | |
| *Orthopedic - Posture: | |
| *Orthopedic - Feet: | |
| *Skin (Non-Commun.): | |
| *Epilepsy: | |
| *Nervous System: | |
| *Speech: | |
| *Nutrition: | needs to avoid sugar |
| *Other: | |

[SAVE]

Fig. 9

Student Preventive Measures and Tests

Your School/District

Parent Emergency Notification System
Student Emergency and Medical Information Collection

Add Preventive Measures and Tests

*Required
First Name: Johnny
Last Name: Quest
*School: Middle School
*Grade: 6

*Date: 10/8/05
*Condition: Measles

Select a Test
TOPV
DPT
Tuberculin Result
Hepatitis B
Chicken Pox
Measles
Mumps
Rubela
Hib © 2006 M   reserved. Patent Pending.

Fig. 10

K12alerts™   How to Send to Schools and Grades
email and cell phone emergency notification

- CampaignBuild
  - list manager
  - image manager
  - campaign manager
- CampaignBlast
- CampaignTrack

| create a list | modify a list | delete a list | manage lists/subscribers |

Create a Schools Query                                         << Back

1. You can use this section to create and save queries. The result from your query can be saved to a new contact list which you can use to send a campaign in the Campaign Blast section.

2. If no matches are found, zero records will be returned. If this happens, go back to the query and make sure check marks appear next to the desired selections and proper lists are selected.

3. You have the option to either save the query or go back and make changes to the query. Once the query is saved, you cannot modify the query. You will need to create a new query.

Select any combination of Schools and Grades:

☐ Ardsley High School
  ☐ Grade 9  ☐ Grade 10  ☐ Grade 11  ☐ Grade 12

☐ Ardsley Middle School
  ☐ Grade 5  ☐ Grade 6  ☐ Grade 7  ☐ Grade 8

☐ Concord Road Elementary School
  ☐ Grade K  ☐ Grade 1  ☐ Grade 2  ☐ Grade 4

Select lists to query from: (Use [SHIFT] or [CTRL] to select multiple lists)

AHS 09
    AHS 10
    AHS 11
    AHS 12

Send to specific schools, grades, district wide, staff or sporting teams

Fig. 12

K12alerts™
email and cell phone emergency notification

Sending Messages

CampaignBlast

Send Campaign (* indicates required fields)

* Enter The Senders Name — Your School

* Select The Senders Email Address — ccsdschools@k12alerts.com (Default Option) ▼ ← Hosted and customized email boxes for schools and districts for sending and tracking messages
  Click here to add a "FROM" Address ?)

To Include personalization in subject line, click: [Include First Name] [*lname] [Include Last Name]
Example: Hello [*fname] [*lname].

* Enter The Subject Line — School Closed

* Select a Campaign — Your School Message ▼

* Select a List — Parents Primary ▼ ← Select a group list to send too

* Select type of email to send to AOL users — HTML ▼ ← Select a message

* Schedule Your Email Campaign

Schedule the date and time you would like the campaign to be sent. Please be sure to check the appropriate option.

Select a Date
Year: 2005
Month: 4
Day: 25
Time: 5 ▼ : 30 ▼  am ▼

<< Back

| April 2005 | | | | | | |
|---|---|---|---|---|---|---|
| Sun | Mon | Tue | Wed | Thu | Fri | Sat |
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

Tools of the Trade
- CampaignBuild
- CampaignBlast
  - Test a Campaign
  - Send a Campaign
  - Campaign Status
- CampaignTrack

Scheduling Options:
Send by Day, Date, and Time or real-time (immediately)

Image Manager Preview

K12alerts™
*email and cell phone emergency notification*

K12alerts® Keep Parents Informed and Children Safe™
*Powered by CampaignBuilder technology*

Home | Logout | Help

- ols of the Trade
- CampaignBuild
- CampaignBlast
- CampaignTrack
- E-Mail Text Reports
- Cell Phone Text Reports
- E-Mail Graphic Reports

CampaignTrack - text based reporting

All Campaigns: Performance Snapshot

Campaign Name:
Today's Date: 5/17/2006 8:44:34 AM

<< Back

| Date Sent | Campaign Name | # Delivered | # Click-through | % Click-through | # Opened | Creative |
|---|---|---|---|---|---|---|
| 7/7/2005 8:30:00 AM | NECC After Show Greeting | 156 | 38 | 24.36% | 135 | View |
| 7/11/2005 8:45:00 AM | NECC Message - CT Supers | 173 | 6 | 3.47% | 87 | View |
| 8/1/2005 9:15:00 AM | Lorriane Follow-up 7/29/2005 | 112 | 16 | 14.29% | 66 | View |
| 8/25/2005 5:30:00 PM | Westchester Supers Lorraine | 370 | 55 | 14.86% | 195 | View |
| 9/30/2005 1:30:00 PM | MESPA Cancellation | 22 | 45 | 204.55% | 86 | View |
| 10/18/2005 1:15:00 PM | MESPA Informetion | 10 | 0 | 0.00% | 10 | View |
| 12/21/2005 9:15:00 PM | Holiday 05 | 12 | 0 | 0.00% | 7 | View |
| 12/22/2005 4:30:00 PM | Holiday 12-22-2005 | 751 | 7 | 0.93% | 355 | View |
| 4/6/2006 2:15:00 PM | KIK Press Release | 10 | 0 | 0.00% | 14 | View |
| 4/6/2006 3:00:00 PM | KIK Flyer | 34 | 2 | 5.88% | 35 | View |
| 4/10/2006 11:15:00 AM | KIK Press Release #2 | 102 | 0 | 0.00% | 68 | View |

Fig. 25b

K12alerts™
email and cell phone emergency notification

K12alerts® Keep Parents Informed and Children Safe™
Powered by CampaignBuilder technology Home Logout Help Tools of the Trade

- CampaignBuild
- CampaignBlast
- CampaignTrack
  E-Mail Text Reports
  Cell Phone Text Reports
  E-Mail Graphic Reports

CampaignTrack - text based reporting

Click-through/Open-view Rate

Campaign Name: Vote for Budget
Today's Date: 5/17/2006 8:43:38 AM

<< Back

| Total Delivered Emails | Total Click-throughs | Total Open-views | % of Conversion rate |
|---|---|---|---|
| 173 | 6 | 87 | 6.90 % |

Fig. 25c

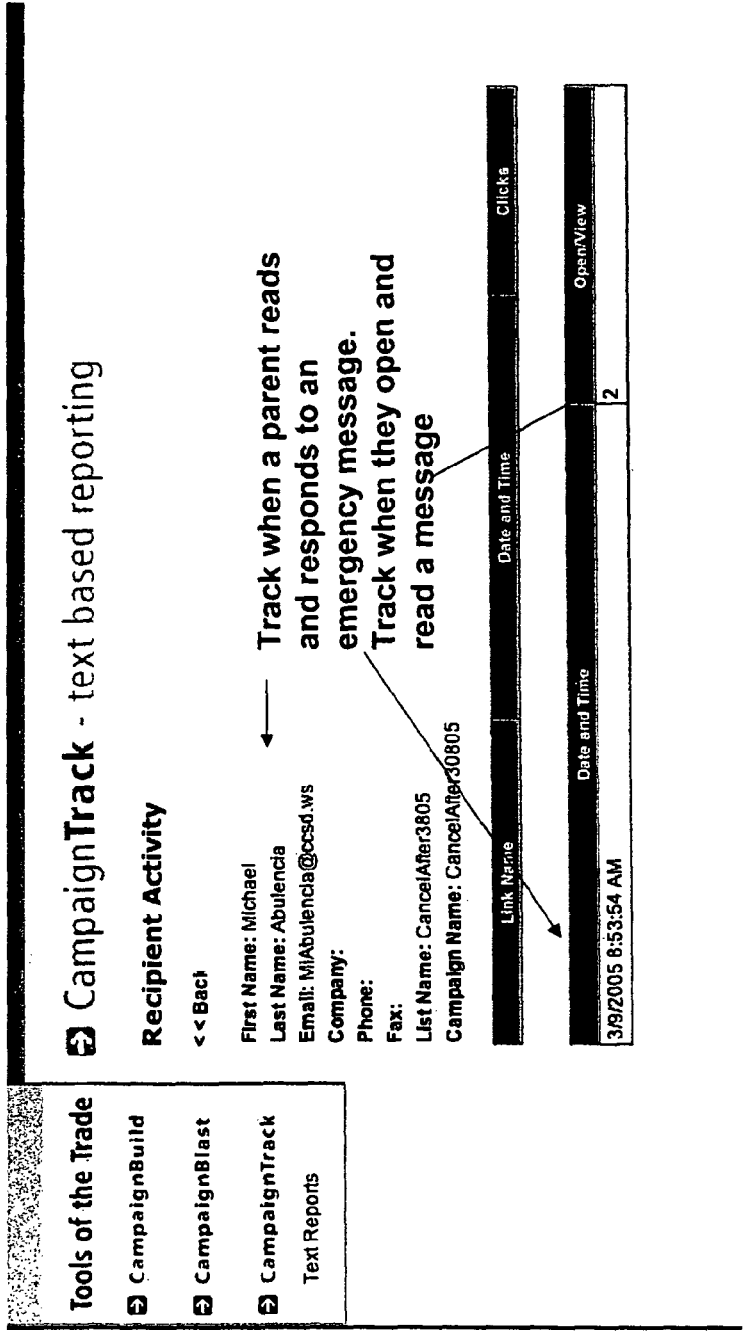
Fig. 26a

Downloads

K12alerts
email and cell phone emergency notification

K12alerts Keep Parents Informed and Children Safe™
Powered by CampaignBuilder technology Home  Logout  Help

Tools of the Trade

CampaignBuild - list manager create a list | modify a list | delete a list | manage lists/subscribers

CampaignBuild
list manager
image manager
campaign manager

CampaignBlast

CampaignTrack

Download List  <<Back

1. Click on the link below to download your list.
2. If the downloaded file opens directly on your browser instead of giving you the option to save, please see next step.
3. Right click on the link with your mouse, choose "Save Target As..." option to save the file.

>>> Download

Fig.28b

K12alerts® Keep Parents Informed and Children Safe™
Powered by CampaignBuilder technology Home  Logout  Help

Tools of the Trade

⊕ CampaignBuild
  list manager
  image manager
  campaign manager
  registration manager ⊕ CampaignBlast

⊕ CampaignTrack

⊕ CampaignBuild - list manager ❶

| create a list | modify a list | delete a list | manage lists/subscribers |

« « Back

Upload a file to the list

* Important Please Read *

1. Please strip out any commas and single quotes from your file before uploading your file.
2. The file should contain column names in the first line.
3. You can upload upto a maximum of 20 fields/columns to your list. with the list name you want this file to be uploaded to.
4. You can also request a new list to be created by sending the required list name in the email. You will be notified by email after the file is uploaded and ready to use. Please inlcude your school name in your email.
5. Your data file must be a comma separated file (.CSV). You can create a .CSV file using Excel. Simply save the data as a .CSV file.
6. Make sure the file is not saved as a "Read Only" file.
7. Click here to download a sample file. This file can be opened in any text editor such as Notepad or in Excel.

Select File  [top\School_Upload.csv] [Browse]

[Submit]

Fig. 29

K12alerts® Keep Parents Informed and Children Safe™
Powered by CampaignBuilder technology Home  Logout  Help

Tools of the Trade

➔ CampaignBuild
 list manager
 image manager
 campaign manager
 registration manager ➔ CampaignBlast

➔ CampaignTrack

➔ CampaignBuild - list manager create a list | modify a list | delete a list

Enter an email address to be notified after upload is complete and then click on Import File.

Email Address: [          ]

[Import File]

Create Fundraising Module

Create Fundraising Module

K12alerts™
*email and cell phone emergency notification*

Tools of the Trade

- CampaignBuild
  - list manager
  - image manager
  - campaign manager
  - registration manager
- CampaignBlast
- CampaignTrack

CampaignBuild - registration manager

| Add Registration | Manage Registration | Manage Registration Users |

Create Registration

Step 4: Select payment options and optional cut-off date for the registration form.

Event Name: *School Dance*

Display Credit Card and Payment Information
○ YES  ● NO

Preview of Payment Information

| Member Cost: 20.00 | *Click here to Edit payment Information* |
| Extra Cost Name: Tickets | |

The following will allow users to add guests to their registration form.
- All guests will be listed under the registrant's name.
- You can create registration badges from the downloadable Excel spreadsheet.

Allow User to Add Guests
○ YES  ● NO

The following will allow you to cut-off registrations after the maximum number of registrations has been reached.
Manually or automatically stop users from registering after a certain date or after a certain number of people have already registered.

Manually Cut-off Registration
○ YES  ● NO

Maximum Number of Registrations: [    ]

Date to cut-off registration: [    ]

Create a type of payment selection

Allow user to select number of guests and enter their names. (Can be used to make name tags)

Fig. 35

Create Fundraising Module

K12alerts — Keep Parents Informed and Children Safe™

CampaignBuild - registration manager

Add Registration | Manage Registration | Manage Registration Users

Create a Registration Page

Step 5: Enter in sender name and email for your auto response to be sent from to the person who registered.

Event Name: *School Dance*

(* indicates required field)

- *Sender Email: rich_msg@yahoo.com
- *Sender Name: School Dance Committee
- *Subject: School Dance Enter registered event Date and location below. These are entered into the email response as a default message.

- Event Date: June 2, 2006 from 7:00 - 11:00pm
- Event Location: Local High School Auditorium The following will allow you to edit the email response that registered users will receive in their Inbox.

Tools of the Trade
- CampaignBuild
  - list manager
  - image manager
  - campaign manager
  - registration manager
- CampaignBlast
- CampaignTrack Setup email confirmation sent back to the user after registering.

Fig. 38

Create Fundraising Module

K12alerts Keep Parents Informed and Children Safe™

CampaignBuild - registration manager

Add Registration | Manage Registration | Manage Registration Users

Create Registration

Step 6: Select fields to be included in your registration form. Unselected fields will not appear in your form.

Select which fields are required (By default, first name, last name and email are required)

Event Name: *School Dance*

☐ Title ☐ Company
☑ Address ☐ City
☐ State ☐ Zip Code
☑ Phone
☐ Industry — Accountants, CPAs
☐ Industry 2 — Accounting Step 1 - Step 2 - Step 3 - Step 4 - Step 5 - Step 6

K12alerts™
email and cell phone emergency notification

Home Logout Help

Tools of the Trade

- CampaignBuild
  - list manager
  - image manager
  - campaign manager
  - registration manager
- CampaignBlast
- CampaignTrack

Fig. 40

Create Fundraising – Registration Page Preview

Your School/District

Register for the School Dance on

June 2, 2006 from 7:00 to 11:00pm at the Local High School Auditorium

*Required Fields

First Name *
Last Name *
Address *

Contact Information

Email Address *
Phone *

SUBMIT

Fig. 41

Your School/District

Parent Emergency Notification System
Student Emergency and Medical Information Collection

Emergency Card Login

New to K12 Alerts?

To subscribe to K12 Alerts, enter your primary E-Mail address below and click Sign Up.

E-Mail Address:

[Sign Up]

OR

Already using K12 Alerts and have a password?

If you've already saved your information with K12 Alerts, login below to manage your profile and password.

E-Mail Address:

K12 Alerts Password:

Security Code:

[Login]

If you forgot your password, click here.

Fig. 42

Your School/District

Parent Emergency Notification System
Student Emergency and Medical Information Collection Step 1: Add general information about the student and their Parent(s)/Guardian(s)

* Required

- Student: Select a Student
- **\*Student First Name:** Roger
- **\*Student Last Name:** Ace
- **\*School:** Middle School
- **\*Grade:** 7

- School Year: 2007-2008
- Address: 445 Hamilton Avenue
- City: White Plains
- State: New York
- Zip Code: 10601

[Continue to Step 2 >>>]

Fig. 43

Your School/District

Parent Emergency Notification System
Student Emergency and Medical Information Collection Step 2: Add Parent/Guardian information for this student

| Parent/Guardian | | | | |
|---|---|---|---|---|
| First Name | Last Name | Relation | Email | |
| Richard | Acevedo | Guardian | richard@messagelogix.com | Edit |

Add

Continue to Step 3

Your School/District

Parent Emergency Notification System
Student Emergency and Medical Information Collection Add Parent/Guardian

* Required
- *First Name:
- *Last Name:
- Relation: Parent
- Non-custodial Parent: No
- Address:
- Home Phone:
- Work Phone:
- *Email:
- Secondary Email:
- Mobile: [ ] Select Carrier
- Fax:

SAVE

Fig. 44

Your School/District

Parent Emergency Notification System
Student Emergency and Medical Information Collection Step 3: Add Student Early Dismissal Information In the event school is closed before regular dismissal time: (please check all that apply)

○ My child may go home only with me.
○ I give my approval for my child (named above) to walk home.
○ I give my approval for my child (named above) to walk home only if accompanied by his/her brother/sister.
◉ In the event that I am unable to pick up my child, I give my approval for my child to go home with the following surrogate.
(A student will not be sent home with anyone not previously approved.)

| Surrogate | | | |
|---|---|---|---|
| First Name | Last Name | Email | |
| Nick | Scryer | nick@midgate.gov | Edit |

Continue to Step 4 >>

Your School/District

Parent Emergency Notification System
Student Emergency and Medical Information Collection

Edit Surrogate

\* Required

| | |
|---:|---|
| *First Name: | Nick |
| *Last Name: | Scryer |
| Address: | |
| Home Phone: | 1234567890 |
| Work Phone: | 9876543210 |
| *Email: | nick@midgate.gov |
| Secondary Email: | |
| Mobile: | [ ] Select Carrier |
| Fax: | |

SAVE

Fig. 45

Your School/District

Parent Emergency Notification System
Student Emergency and Medical Information Collection

Step 4: Add Student's Emergency Call Information

STUDENT EMERGENCY INFORMATION

In case of illness or injury, the school personnel is legally responsible for first aid only. It is the school policy to notify parents immediately when home care or immediate medical care is indicated. Frequently, parents cannot be reached. Please assist us in giving your child the proper care by supplying the information requested -- on this form.

IF MY CHILD NEEDS IMMEDIATE MEDICAL CARE AND WE CANNOT BE REACHED, CALL:

| Name | Type | Phone No. | |
|------|------|-----------|---|
| Strongwater | Doctor | 9148546543 | Edit |

Add Dentist

Add Hospital

IF MY CHILD IS ILL OR INJURED AND WE CANNOT BE REACHED, CALL:

| Name | Type | Phone No. | |
|------|------|-----------|---|
| Ralph | Friend/Relative | 9147415240 | Edit |

Add Friend/Relative

Continue to Final Step >>

---

Your School/District

Parent Emergency Notification System
Student Emergency and Medical Information Collection

Edit Emergency Call Information

\* Required

- **\*Name:** Strongwater
- Type: Doctor
- **\*Phone No:** 9148546543
- Secondary Phone No:
- Mobile Phone No:

SAVE

Fig. 46

Your School/District

Parent Emergency Notification System
Student Emergency and Medical Information Collection

Step 5: Confirm Emergency Card information before final save.
*Required

- Student: Select a Student
- *Student First Name: Roger
- *Student Last Name: Ace
- *School: Middle School
- *Grade: 7
- School Year: 2007-2008
- Address: 445 Hamilton Avenue
- City: White Plains
- State: New York
- Zip Code: 10601

Parent/Guardian

| First Name | Last Name | Relation | Email | |
|---|---|---|---|---|
| Richard | Acevedo | Guardian | richard@messagelogix.com | Edit |

Add

In the event school is closed before regular dismissal time: *(please check all that apply)*

- ○ My child may go home only with me.
- ○ I give my approval for my child *(named above)* to walk home.
- ○ I give my approval for my child *(named above)* to walk home only if accompanied by his/her brother/sister.
- ● In the event that I am unable to pick up my child, I give my approval for my child to go home with the following surrogate.
  *(A student will not be sent home with anyone not previously approved.)*

Surrogate

| First Name | Last Name | Email | |
|---|---|---|---|
| Nick | Scryer | nick@midgate.gov | Edit |

Fig. 47

STUDENT EMERGENCY INFORMATION

In case of illness or injury, the school personnel is legally responsible for first aid only. It is the school policy to notify parents immediately when home care or immediate medical care is indicated. Frequently, parents cannot be reached. Please assist us in giving your child the proper care by supplying the information requested -- on this form.

IF MY CHILD NEEDS IMMEDIATE MEDICAL CARE AND WE CANNOT BE REACHED, CALL:

| Name | Type | Phone No. | |
|---|---|---|---|
| Strongwater | Doctor | 9148546543 | Edit |

Add Dentist

Add Hospital

IF MY CHILD IS ILL OR INJURED AND WE CANNOT BE REACHED, CALL:

| Name | Type | Phone No. | |
|---|---|---|---|
| Ralph | Friend/Relative | 9147415240 | Edit |

Add Friend/Relative

Enter the text you see below into the box on its right.

*72451*

This step is for added security.

SAVE  EDIT

Fig. 48

Your School/District

Parent Emergency Notification System
Student Emergency and Medical Information Collection Thank you for completing the Emergency Card Collection System.

Your Security Code is E051120061 7333100071

You will need this code in order to enter another Emergency Card into the system.

⊙ I have children in the School District. I would like to be notified by e-mail about school closings, early dismissals, school calendar updates, budget information and any other district news.

| Student ID | First Name | Last Name |
|---|---|---|
| 99999 | John | Smith |
| Grade | School | |
| 7 | Middle School | |

| Student ID | First Name | Last Name |
|---|---|---|
| 757575 | Allen | Smith |
| Grade | School | |
| 8 | High School | |

| Student ID | First Name | Last Name |
|---|---|---|
| 1234567890 | Mary | Smith |
| Grade | School | |
| 3 | Elementary School | |

| Student ID | First Name | Last Name |
|---|---|---|
|  |  |  |
| Grade | School | |
| - | Select School | |

○ I do not have children in the School District. However, I would like to be notified by e-mail about school closings, early dismissals, school calendar updates, budget information and any other district news.

[Click Here to Continue]

Fig. 50

Your School/District

Parent Emergency Notification System
Student Emergency and Medical Information Collection

Edit Emergency Card Backend User

Gregory Bender

| | |
|---|---|
| Username | *K12ALERTS* |
| *Password | ••••••• |
| *First Name | Gregory |
| *Last Name | Bender |
| Title | |
| User Level | ⦿ Level 1 - Complete access |
| | ○ Level 2 - Approve/Download only |
| | ○ Level 3 - Add/Edit only |
| | ○ Level 4 - View only |
| Manage Users | ☑ |

Update

Your School/District

Parent Emergency Notification System
Student Emergency and Medical Information Collection

| First Name | Last Name | User Name | Password | Title | |
|---|---|---|---|---|---|
| Gregory | Bender | K12ALERTS | K12294TI | | Edit |

Fig. 52

Your School/District

Parent Emergency Notification System
Student Emergency and Medical Information Collection

Edit Parent/Guardian User

Search For [          ]
Select Field [Parent/Guardian First Name ▾]
School [Select a School ▾]
Grade [   ▾]

[Search]

Select a User

[Richard Acevedo ▾]

---

Edit Contact

Please fill the form below to add a new contact. Make sure fields marked required are filled.

(* Indicates required field)

First Name       [Richard]
Last Name        [Acevedo]
*Contact Type:   [Parent/Guardian ▾]

Fig. 54

| | |
|---|---|
| *Contact Type: | Parent/Guardian |
| Title | |
| Company Name | |
| Address | |
| Address 2 | |
| City | |
| State | Click to Select |
| Zip Code | |
| Phone | |
| Fax | |
| Mobile Phone | |
| Web Address | |
| *Email Address | richard@messagelogix.com |
| Comments | |

Submit

Fig. 55

Your School/District

Parent Emergency Notification System
Student Emergency and Medical Information Collection

Defaults Information Screen

Select Default City and State for all Parent/Guardians in your District

City:

State: Click to Select

Should Parent(s)/Guardian(s) have access to No Child Left Behind
○ YES  ● NO

Should Parent(s)/Guardian(s) be allowed to add an Orthodontist
○ YES  ● NO

| These select how many the parent/guardian may add to the Emergency Card | | | | | |
|---|---|---|---|---|---|
| Guardian | Doctor | Dentist | Hospital | Friend/Relative | Surrogate |
| 2 | 1 | 1 | 1 | 2 | 1 |

Submit

---

Your School/District

Parent Emergency Notification System
Student Emergency and Medical Information Collection

Disclaimer Information Screen

Should Parent/Guardian see a disclaimer or a printable page.
○ Disclaimer  ● Printable Page Disclaimer for Parent/Guardian to see after confirming their information.

Submit

Fig. 57

Your School/District

Parent Emergency Notification System
Student Emergency and Medical Information Collection

Edit Emergency Card Checkboxes

☐ Is your child allows to tkae field trips in the local community.

| Keyword | Description |
|---|---|
| Walking | Is your child allows to tkae field trips in the local community. |
| | |
| | |
| | |

Your School/District

Parent Emergency Notification System
Student Emergency and Medical Information Collection

| Manage Users | Search | Download | Add New Record |

Emergency Card Approval

This is for approving the information in the selected BlueCard.

This Emergency Card Is Approved By: Gregory Bender

---

Your School/District

Parent Emergency Notification System
Student Emergency and Medical Information Collection

| Manage Users | Search | Download | Add New Record |

Emergency Card Download Listing

Download your listing of student information

1. Choose the data you want to download.
2. The download file is a Comma Seperated File (*filename.csv*).
The first line contains the field names.

Search For: [            ]  ☐ All Approved

School: [Select a School ▼]

Select Field: [Student First Name ▼]  ☐ All Pending

[Download Full Listing]
[Download Search Criteria]

SYSTEM FOR MANAGING AND MESSAGING CRITICAL STUDENT INFORMATION

CROSS-REFERENCE TO RELATED APPLICATIONS

This patent application claims the benefit of, under Title 35, United States Code, Section 119(e), U.S. Provisional Patent Application No. 60/681,854, filed May 17, 2005.

FIELD OF THE INVENTION

The present invention relates to a system for managing critical student information. More specifically, the invention relates to a system for permitting authorized users to access information and send messages for students that are members of particular groups.

BACKGROUND OF THE INVENTION

With the improved capabilities of computer software and networks with respect to handling information storage and retrieval, various types of systems have arisen for automating, to various degrees, the management of information. Additionally, with the advent of various new types of communications, such as email and cell phones, the ability to effectively communicate information to interested individuals has likewise increased.

As a result, certain types of computerized information delivery systems have been developed. For example, U.S. Patent Application No. 2005/0013417 by Zimmers et al. discloses an alert notification system that automatically disseminates a warning for dangerous conditions-such as, for example, a storm, a chemical fire, or a threatened gas explosion—to the people in the affected geographic area, school, or organization.

However, to date, little has been done to implement this type of automation in a way that is adapted to accommodate the information that must be managed in typical school systems. A standard school district may have thousands of students, ranging from kindergarten (and in some cases, even, publicly funded pre-school) through twelfth grade. These students will typically be dispersed throughout different schools that are based on school level, such as elementary, middle, junior high, and high schools, and in larger towns or cities, multiple numbers of such schools may exist that further divide up a multitude of students based on geographic location.

For example, in a medical emergency, a school nurse or a soccer coach may suddenly need to have access to a student's medical information in order to appropriately diagnosis or treat the student. Similarly, they may need to access the contact information for the student's parent or guardian in such an emergency. Generally, such information is kept in a "hard" file, such as a file folder, or more recently, in a basic computer database.

Further, in certain situations, a school official may need to contact the parents of certain groups of individuals, such as to let to the parents of students on a particular team know that a practice has been cancelled, or to notify all parents of the students in a particular school that there will be an early dismissal due to a loss of heat, or to inform all the parents in a school district of a snow closing. Generally, such communication is carried out by manually telephoning the parents of the students in order to reach whoever can be reached, or by some form of passive communication of the information, such as by posting the information on a website or reporting it to radio and/or telephone stations, in which cases it is incumbent upon the parents to be aware that the information is being communicated in the first place.

One system that has been proposed is disclosed in U.S. Patent Application No. 2005/0091368 by Ozburn, which describes an interactive crisis management and information system. The system actively notifies members of a student's household of crisis conditions by sending information via cell phones, pages, email, and other forms of communication. The system maintains a database of a student's household information that indicates who in the household will receive what crisis information, and who may take custody of the student. This system, however, is a basic notification system that does not address the challenges associated with properly managing the information for a large amount of students and determining which administrators or school personnel can access information and send messages for which students, and how this can be effectively accomplished and tracked for all different groups and subgroups of students.

The proper collection, maintenance, and availability of student information is extremely important. Therefore, a versatile and robust system is required to meet the various information needs for large amounts of students that comprise many different groups, which can result in a whole variety of different situations in which access to student-specific information, and further, the communication of information relevant to those students, is critical and time-sensitive.

What is desired, therefore, is a system for managing critical student information that effectively manages information for various different groups of students. What is further desired is a system for managing critical student information that regulates the ability of different users to access and send information for different student groups. What is also desired is a system that efficiently communicates, transfers, and tracks the student information.

SUMMARY OF THE INVENTION

Accordingly, it is an object of the present invention to provide a system for managing critical student information that is able to transmit student information via multiple forms of communication and/or to multiple destinations for a particular student.

It is a further object of the present invention to provide a system for managing critical student information that regulates access to student information and/or the ability to send student information based on the identity of the user.

It is yet another object of the present invention to provide a system for managing critical student information that controls access to and communication of student information based group membership.

It is still another object of the present invention to provide a system for managing critical student information that at least partially automates the creation, scheduling, and tracking of communicated information.

In order to overcome the deficiencies of the prior art and to achieve at least some of the objects and advantages listed, the invention comprises a method of managing student information, including storing communication data for each one of a plurality of students, associating at least one of a plurality of group identifiers with the stored communication data for each of the plurality of students, wherein each of the group identifiers identifies a group of students, storing a plurality of sender identifiers, wherein each sender identifier identifies a particular sender of student information, associating with each sender identifier at least one of the plurality of group identifiers, wherein each of the group identifiers associated with a particular sender identifier identifies a group for which the particular sender identified by the particular sender identifier is authorized to send student information, receiving a sender identifier via a user input and, in response thereto, retrieving each of the group identifiers associated with the received sender identifier, and communicating student information to at least one destination using the communication data stored for at least one student having a group identifier associated therewith that is also a group identifier that is associated with the received sender identifier.

In some of these embodiments, the invention comprises In some of these embodiments, the invention further includes receiving a selection command from the user, wherein the selection command selects at least one group identifier from among a plurality of group identifiers associated with the received sender identifier, and wherein the step of communicating comprises communicating the student information only to groups associated with selected group identifiers.

In certain embodiments, the invention includes communicating student information to more than one destination corresponding to a particular student.

In some of these embodiments, the invention further includes the step of storing a message supplied by the user, wherein communicating student information comprises communicating the message to the at least one destination. In certain embodiments, the message is created using a template. In some cases, the message is a fundraising registration form.

In certain embodiments, the invention includes receiving scheduling data, wherein the scheduling data indicates when the student information is to be communicated, and wherein the step of communicating comprises communicating the student information according to the scheduling data. In some case, the invention includes communicating the student information according to the scheduling data comprises transmitting recurring messages.

In some embodiments, a first one of the groups is a subgroup of a second one of the groups. In some cases, the group identifier associated with the subgroup identifies a group consisting of students that attend a particular school, are in a particular grade, are in a particular class, have a particular medical condition, are on a particular team, or are in a particular club.

In certain embodiments, the invention includes receiving recipient data for each destination to which the student information was communicated, wherein the recipient data received for a particular destination indicates whether the information communicated to the particular destination was received, and recording the received recipient data. In some of these embodiments, the received recipient data includes recipient data for student information communicated via electronic mail, wherein the received recipient data for electronic mail further indicates whether the electronic mail has been read. In some cases, the invention includes repeating the step of communicating the student information for each particular destination for which the recipient data received therefor indicates that the student information was not received.

In some cases, the student information comprises communicating text information, and the communication data comprises at least one of a telephone number and an electronic mail address, and the text information comprises at least one of a text message, a facsimile, and an electronic mail message. In other cases, the student information comprises communicating an audible message, and the communication data comprises a telephone number.

In another embodiment, the invention comprises a method of managing student information, including storing student data for each one of a plurality of students, associating at least one of a plurality of group identifiers with the stored student data for each of the plurality of students, wherein each of the group identifiers identifies a group of students, storing a plurality of user identifiers, wherein each user identifier identifies a particular user, associating with each user identifier at least one of the plurality of group identifiers, wherein each of the group identifiers associated with a particular user identifier identifies a group for which the particular user identified by the particular user identifier has access to the student data, receiving a user identifier via a user input and, in response thereto, retrieving each of the group identifiers associated with the received user identifier, receiving a request from the user identified by the received user identifier to retrieve the student data stored for a particular student and, in response thereto, determining whether the student data stored for the particular student has a group identifier associated therewith that is also a group identifier associated with the received user identifier, and providing the user identified by the received user identifier with the student data stored for the particular student only if the student data stored for the particular student has a group identifier associated therewith that is also a group identifier associated with the received user identifier.

In some of these embodiments, the invention comprises In some of these embodiments, the student data includes communication data. In certain of these embodiments, the invention further includes communicating information to a destination corresponding to the particular student using the communication data stored for the particular student.

In some of these embodiments, the student data includes medical data, which in some cases, includes a doctor identification data.

In some embodiments, the student data includes parent surrogate identification data.

In certain embodiments, the invention further includes uploading the student data to a remote device. In some case, this includes uploading the student data to a portable communication device.

In some embodiments, the invention further includes associating at least one of a plurality of guardian identifiers with the stored student data for each of the plurality of students, wherein each of the guardian identifiers identifies a person authorized to provide the student data associated therewith.

In certain embodiments, the invention further includes uploading the student data for each of the plurality of students to a school database for storage thereon. In some of these embodiments, the school database is located at a first school, and the invention further includes deleting the student data for at least some of the students from the school database at the first school, and uploading the deleted student data to a second school database located at a second school.

In yet another embodiment, the invention comprises a method of managing student information, including storing student data for each one of a plurality of students, wherein the student data includes communication data, associating at least one of a plurality of group identifiers with the stored student data for each of the plurality of students, wherein each of the group identifiers identifies a group of students, storing a plurality of user identifiers, wherein each user identifier identifies a particular user, associating with each user identifier at least one of the plurality of group identifiers, wherein each of the group identifiers associated with a particular user identifier identifies a group for which the particular user identified by the particular user identifier has access to the student data, receiving a user identifier via a user input and, in response thereto, retrieving each of the group identifiers associated with the received user identifier, receiving a request from the user identified by the received user identifier to retrieve the student data stored for a particular student and, in response thereto, determining whether the student data stored for the particular student has a group identifier associated therewith that is also a group identifier associated with the received user identifier, providing the user identified by the received user identifier with the student data stored for the particular student only if the student data stored for the particular student has a group identifier associated therewith that is also a group identifier associated with the received user identifier, and communicating information to a destination using the communication data stored for the particular student.

BRIEF DESCRIPTION OF THE DRAWINGS

FIG. 6 is a screenshot of the system implemented in FIG. 1 where a user can enter communication information.

FIGS. 8-10 are screenshots of the system implemented in FIG. 1 where a user can associate medical information with a student.

FIG. 12 is a screenshot of the system implemented in FIG. 1 where a user can select the groups to be included in a list.

FIG. 13 is a screenshot of the system implemented in FIG. 1 where a user can send and schedule messages to particular groups.

FIGS. 14-15 are screenshots of the system implemented in FIG. 1 where a user can build a template for an email message.

FIG. 17 is a screenshot of the system implemented in FIG. 1 where a user can upload images to be used in templates.

FIG. 19 is a screenshot of the system implemented in FIG. 1 where a user views an uploaded image.

FIGS. 20-21 are screenshots of the system implemented in FIG. 1 where a user can personalize a template.

FIGS. 25A-C are screenshots of the system implemented in FIG. 1 where a user can review recipient data.

FIGS. 26A-B are screenshots of the system implemented in FIG. 1 where a user can review the recipient data for particular recipients.

Figure 27A:
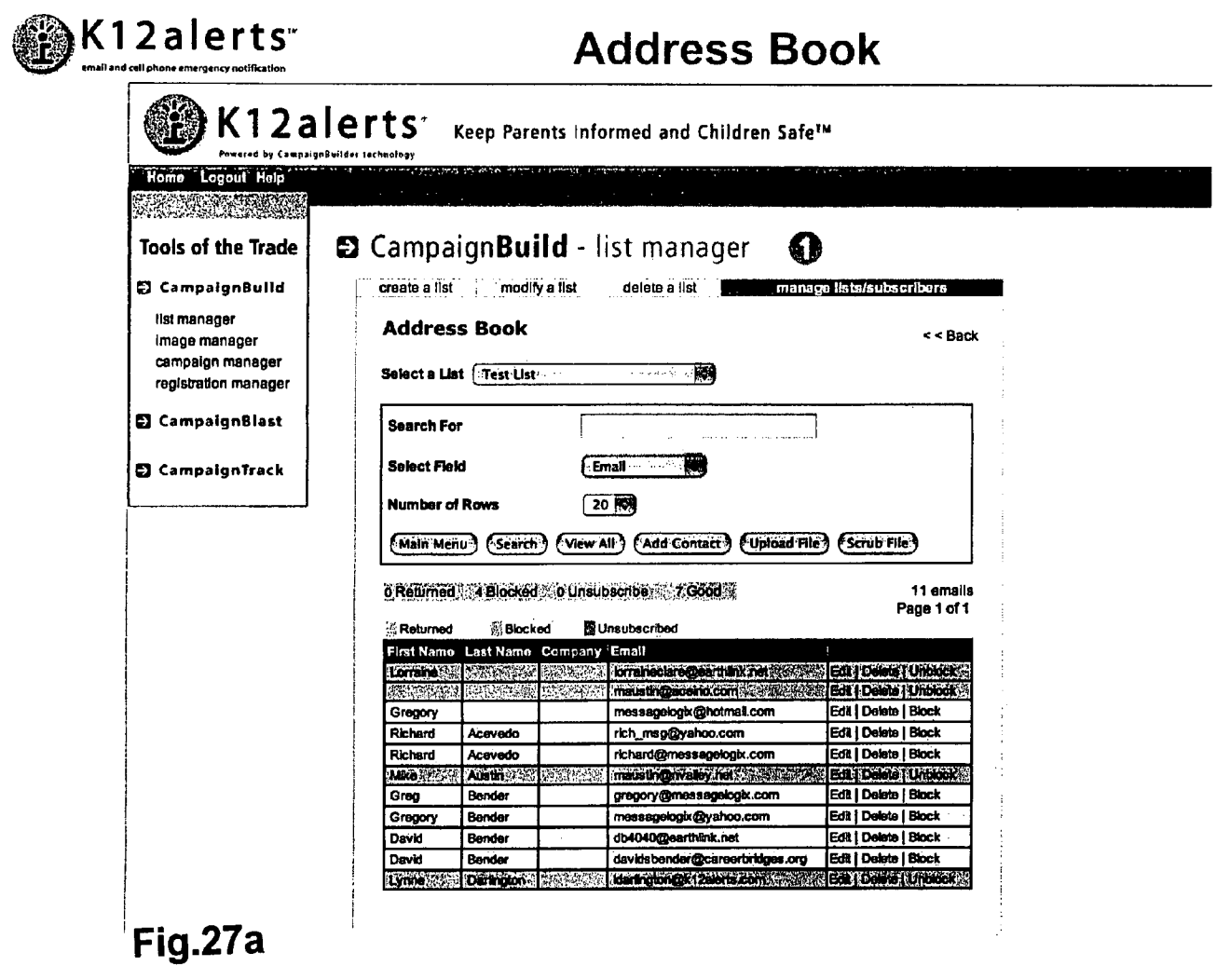
Figure 27B:
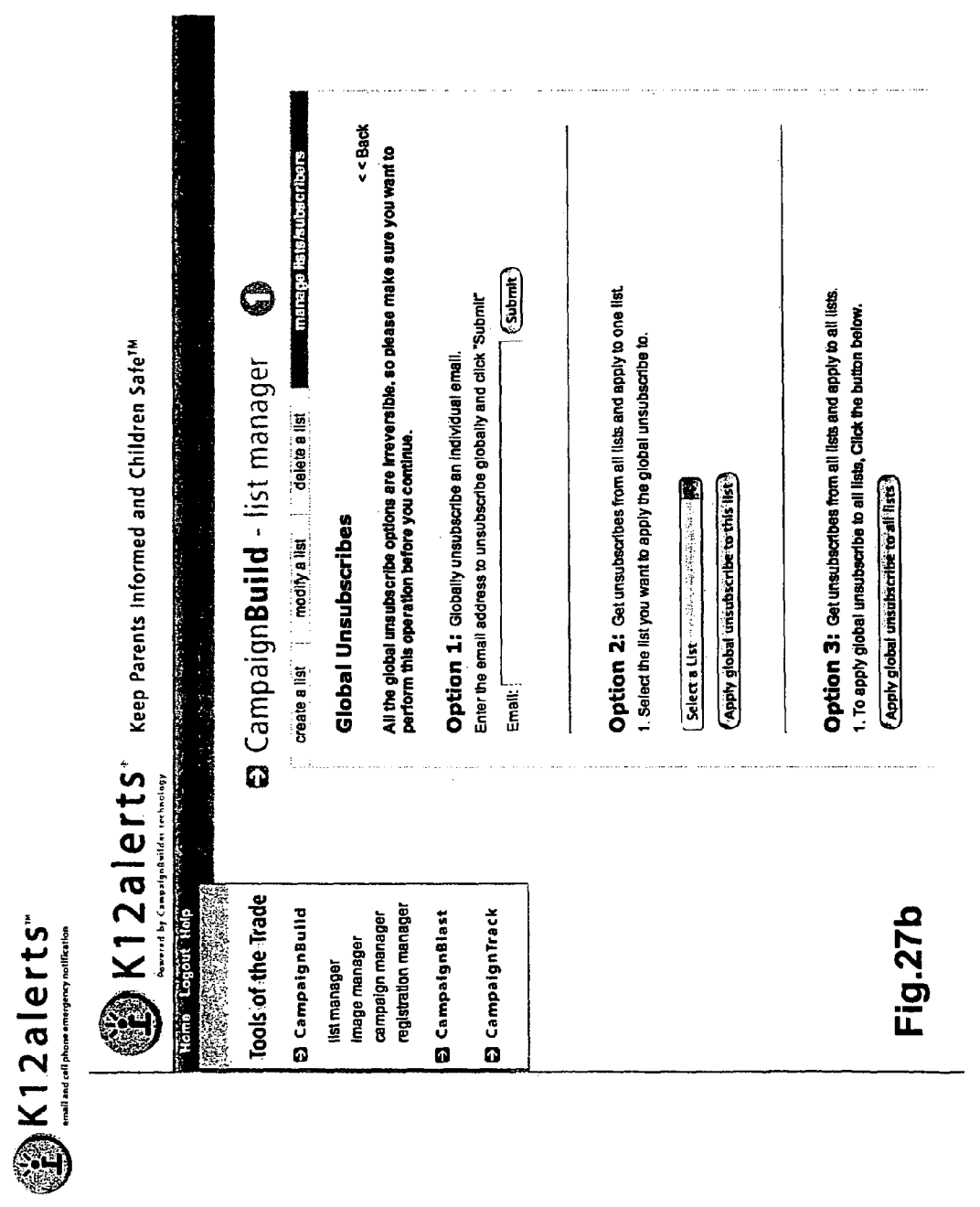
Figure 27D:
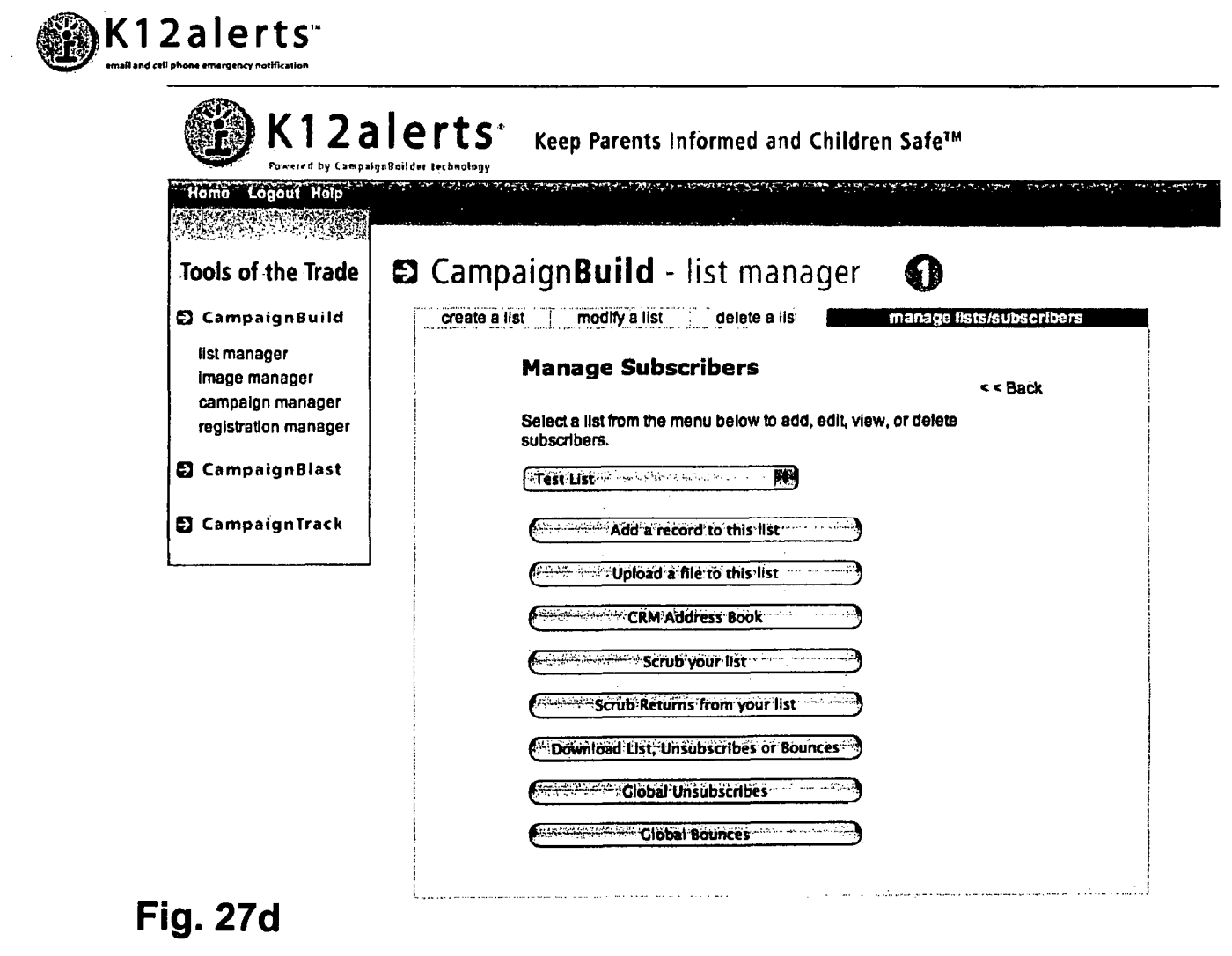

FIGS. 27A-D are screenshots of the system implemented in FIG. 1 where a user can manage lists.

FIGS. 28A-B are screenshots of the system implemented in FIG. 1 where a user can download various lists.

FIGS. 29-31 are screenshots of the system implemented in FIG. 1 where a user can upload files.

FIGS. 32-41 are screenshots of the system implemented in FIG. 1 where a user can build fundraising forms.

FIGS. 42-50 are screenshots of the system implemented in FIG. 1 where parents and/or guardians can access the system and input and/or edit student data.

FIGS. 51-61 are screenshots of the system implemented in FIG. 1 where school administrators and personnel can access the system to access student data and perform administrative tasks.

DETAILED DESCRIPTION OF THE INVENTION

Figure 1:
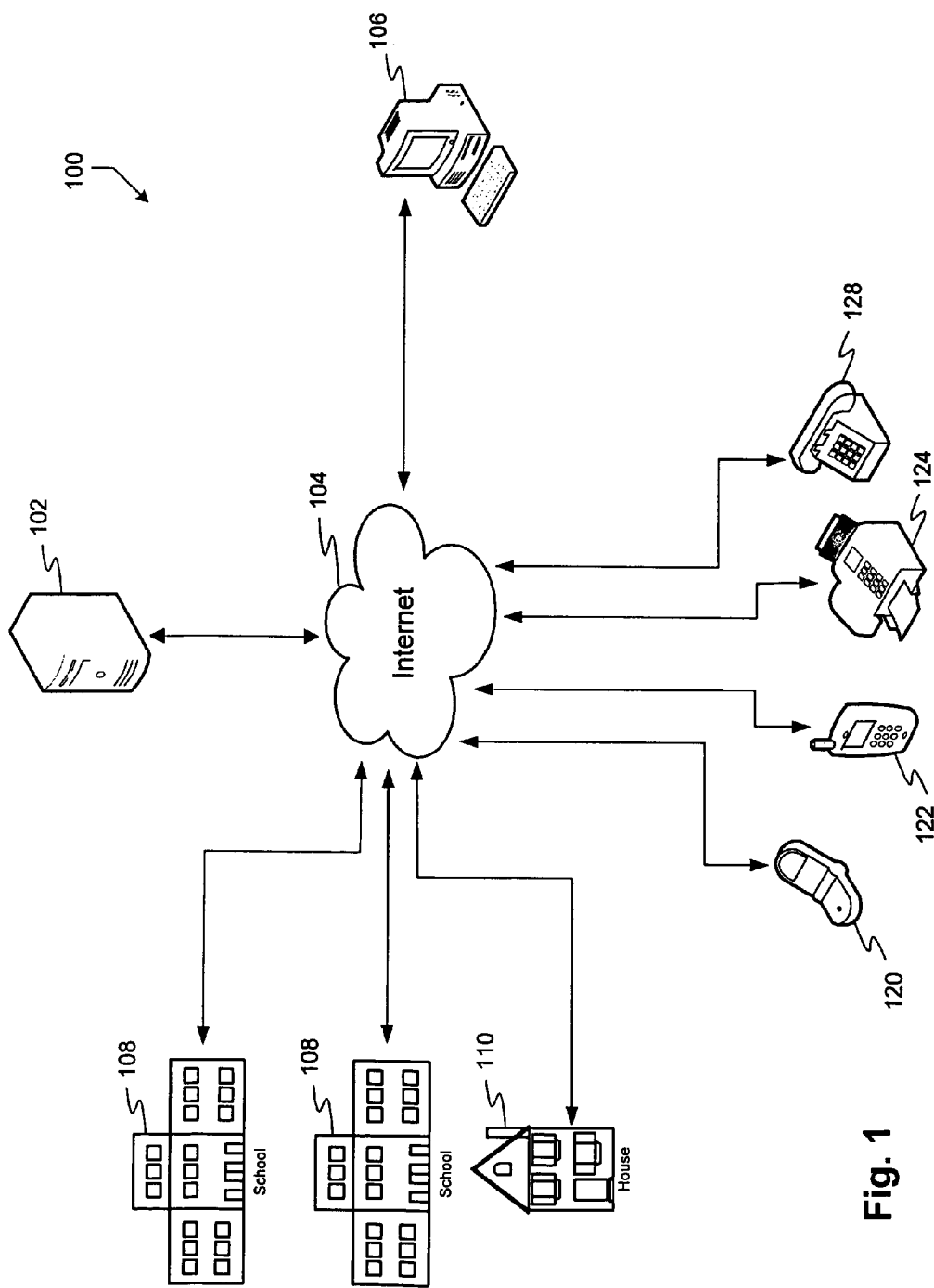
FIG. 1 is a schematic view of a network of devices for implementing a system for managing student information in accordance with the invention.
Figure 2:
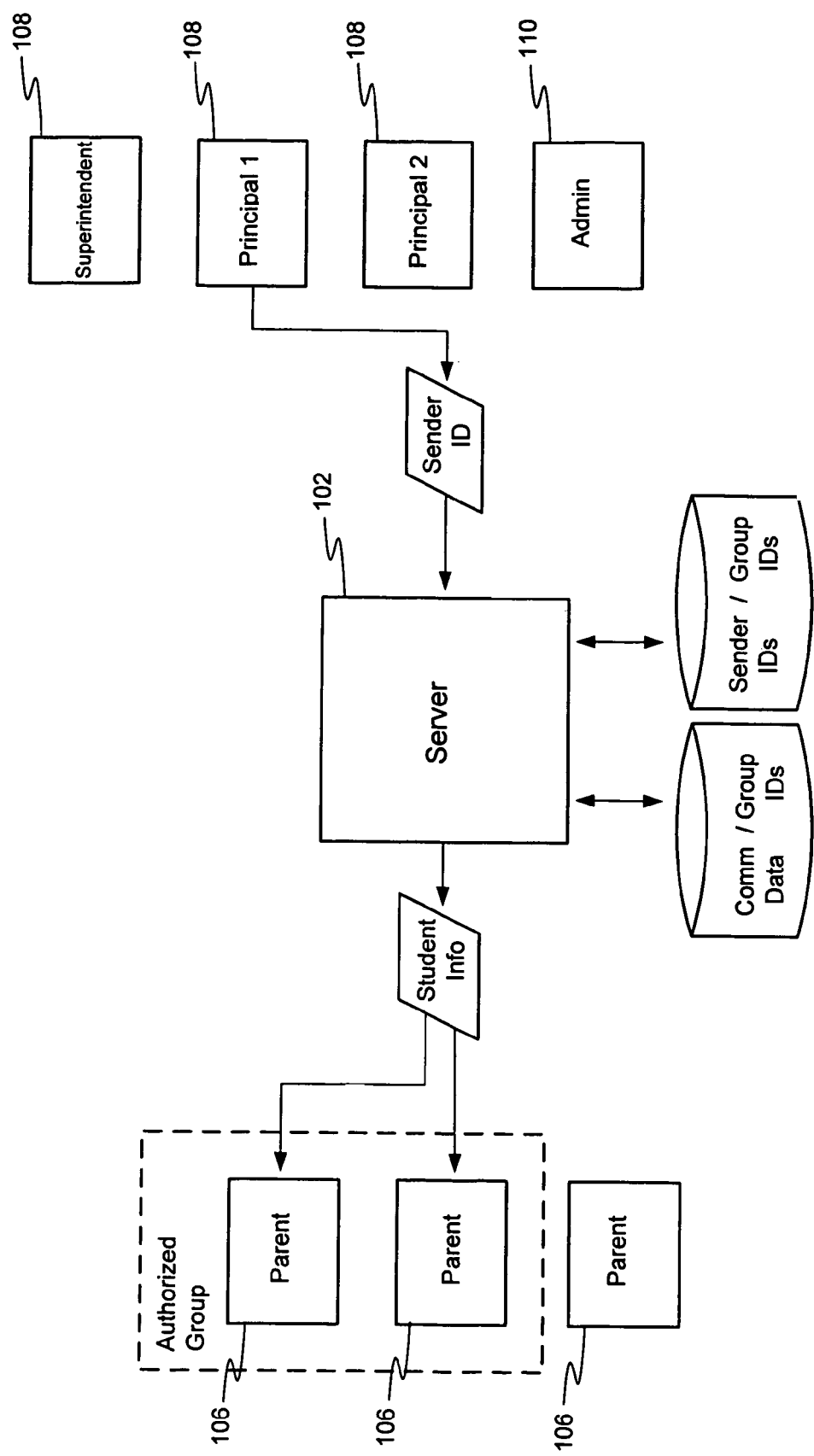
FIGS. 2-3 are schematic views of the operation of the system of FIG. 1.
Figure 3:
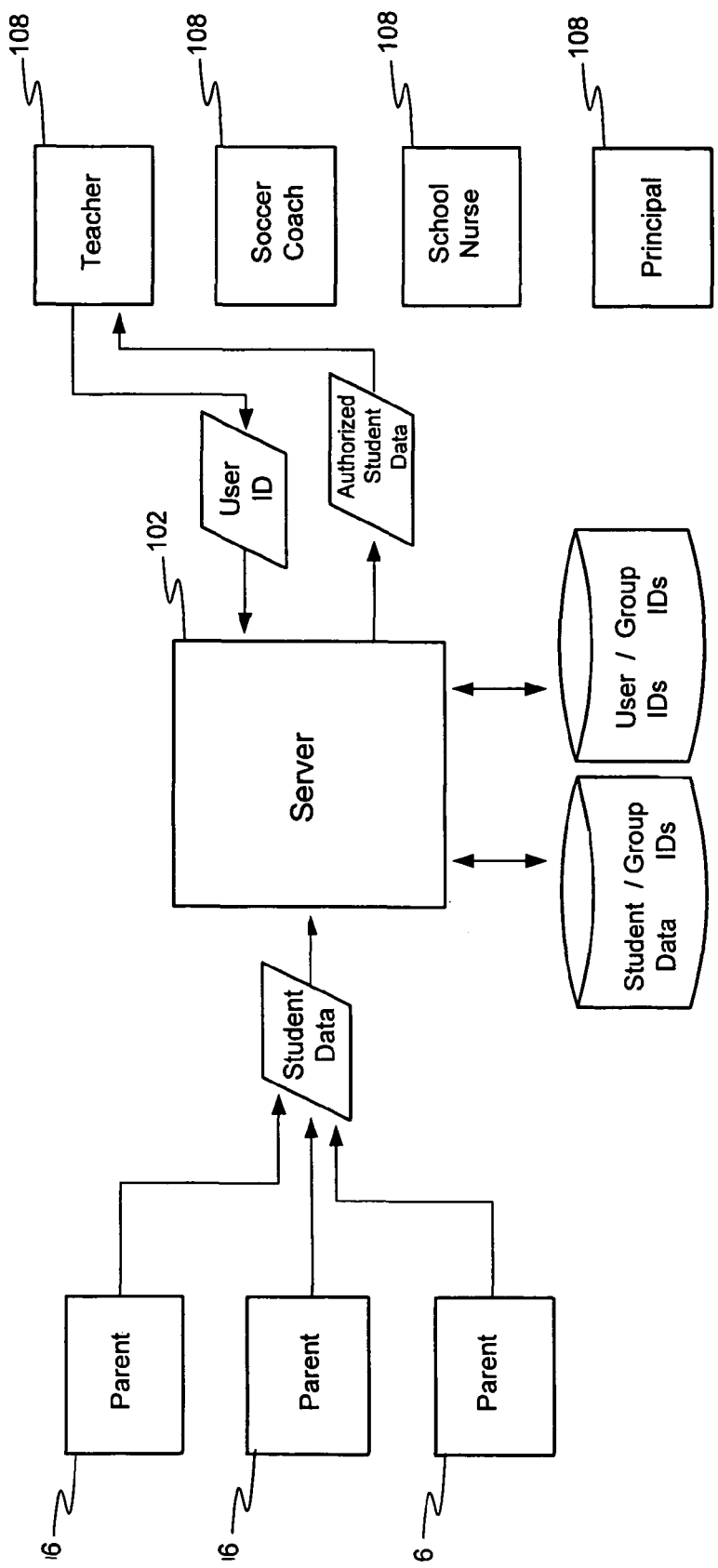
Figure 4:
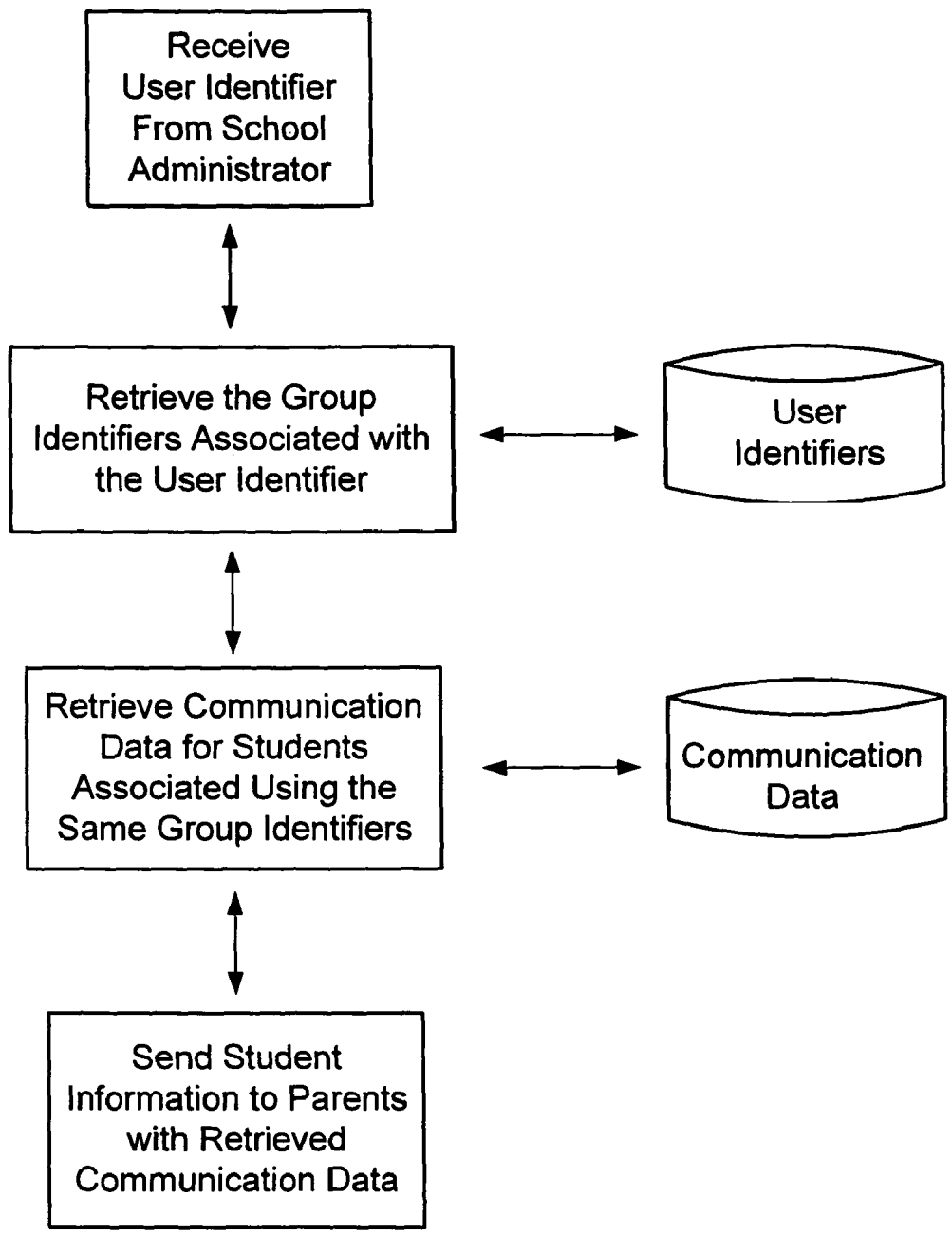
FIGS. 4-5 are flow charts illustrating the steps of the operations depicted in FIGS. 2-3.
Figure 5:
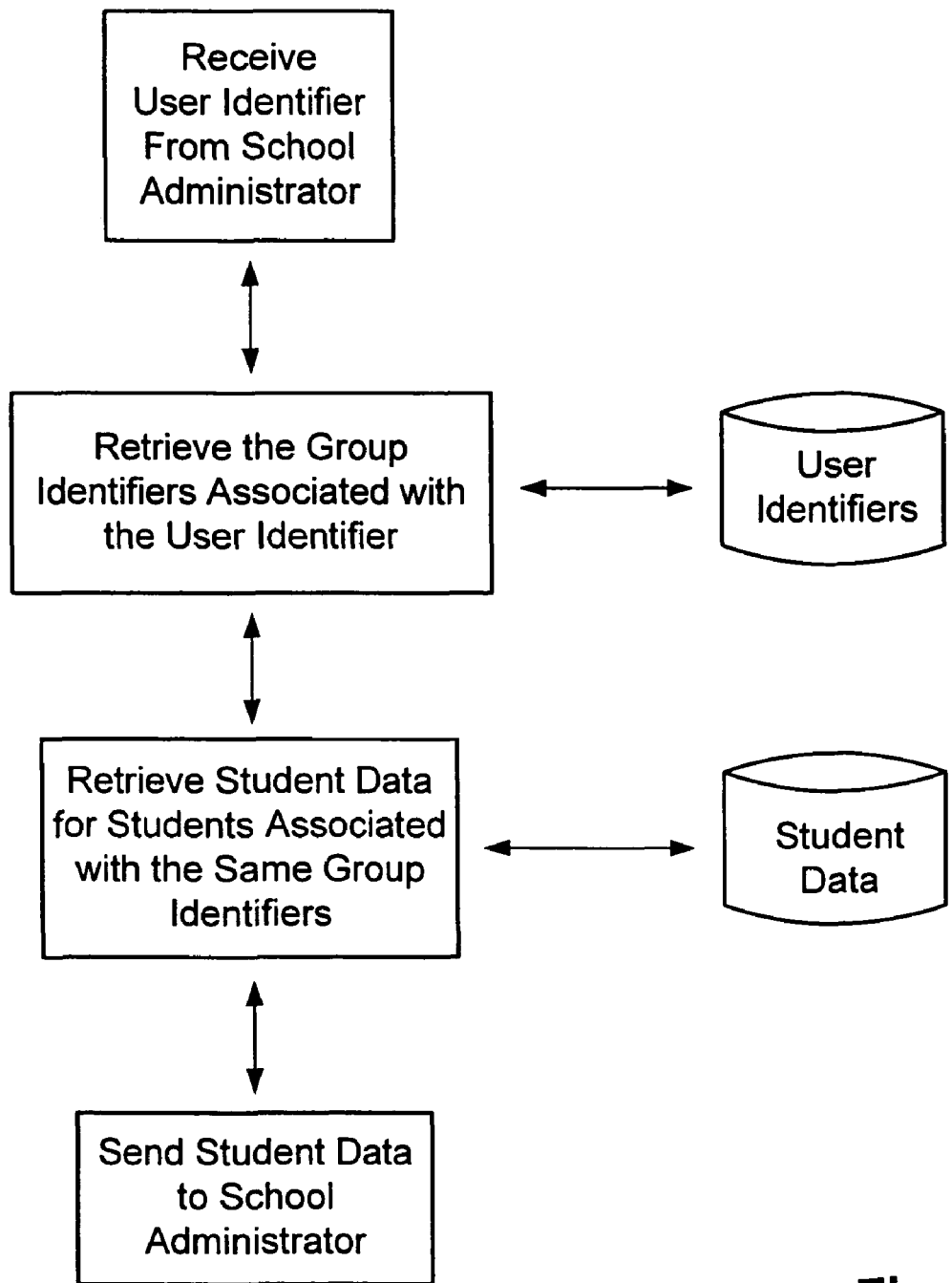

The basic components of one embodiment of a system for managing student information in accordance with the invention are illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The system 100 includes a server 102 that is accessible by parents or guardians of students via a network 104, which may for example, comprise, the Internet, a WAN (Wide Area Network), a LAN (Local Area Network), a PSTN (public switched telephone network), etc. In typical embodiments, the server is connected to the Internet 104, and thus, is accessible by parents and or guardians via a personal computer 106. As a result of this accessibility, parents and/or guardians are able to supply, review, and/or update information maintained on the server 102 pertaining to their children, as is shown in FIGS. 2-5 and is further described below.

Similarly, the server 102 is also accessible via the network 104 by school administrators, teachers, and other school personnel, typically by computers located in individual schools 108, but also, in the case o the Internet 104, for example, is also accessible from other locations, such as a personal computer in another building or an administrator's home 110 or by wireless means, such as a PDA or laptop with wireless Internet connections. As a result of this accessibility, school administrators and other personnel are able to access a student's information maintained on the server 102 and communicate messages to the parents of the student via anyone one of various communications devices, such as a cell phone 120, a PDA (Personal Digital Assistant) 122, a fax machine 124, a home phone 126, or to a home computer 106, as is shown in FIGS. 2-5 and is further described below.

Though, in the advantageous embodiments described above, the server 102 is located remotely from the schools 108, as explained above, in other embodiments, an individual server 102 that serves a particular school 108 may be maintained in that school, or a server that 102 that serves a particular district may be maintained in a particular administrative building in that district. Further, while in the advantageous embodiments described above the computer is accessible to parents/guardians by a home computer 106 via the Internet 104, in other embodiments, kiosks may be provided in the school 108 for allowing parents to access the server 102, such as may be necessary if the server 102 is not accessible via the Internet, or as an alternative for parents in the event certain households do not own a computer.

Figure 7:
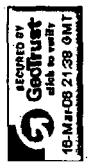
FIG. 7 is a screenshot of the system implemented in FIG. 1 where a user can select group identifiers.

Referring to FIGS. 6-7, a user who would like to receive notifications of various types of information pertaining to the school and its students initiates use of the system by creating an account. Using a computer or kiosk, the user is presented with a registration form, in which the user enters a name and password, and then supplies communication data that identifies how the user can be contacted, such as an email address at which the user can receive emails, and a cell phone number at which the user can receive emergency text messages.

Parent may then enter the name of each of their children. Several criteria can then be selected for each child entered, each of which serves to associate a particular group identifier with that child to identify those groups of which the child is a member. For example, as shown in FIG. 7, a particular school within a district can be selected, as well as a particular grade. Numerous other group identifiers are possible, such as selecting the child's teacher in order to identify a particular class, or selecting a particular sports team or extra-curricular club. Similarly, an identifier may be associated with each student that identifies the school district, such that this identifier will identify all students in any school in that district.

Figure 8:
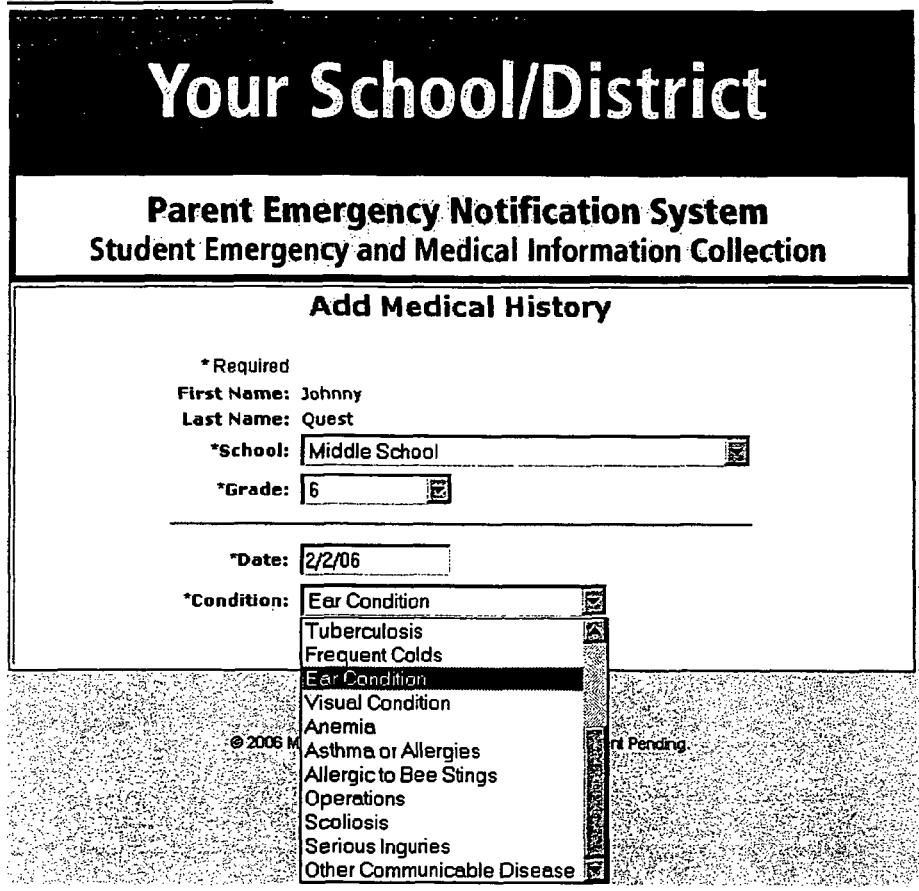

As shown if FIGS. 8-10, other group identifiers may relate to medical information, including the identification of medical conditions, such as, for example, to identify all students with hypertension or all students that currently have a dangerous communicable disease, or the identification of examinations to be performed. Such identifiers can prove very useful for allergy identification, such as, for example, allowing the school nurse or principal to quickly access a list of all students with a peanut allergy, or to communicate a message to parents of those students having a bee allergy in the event of a bee infestation. Further, it should be noted that, even if groups or lists of students are not identifiable according to this information, certain embodiments simply store such information as part of the student data accessible by authorized users, as is further described below.

Figure 11:
FIG. 11 is a screenshot of the system implemented in FIG. 1 where a user can elect to create a list.

Based on these group identifiers, a school official is able to send messages to parents of specific groups and subgroups of students. As shown in FIGS. 11-12, a list manager can be employed to create and save various different lists. By querying the data stored for students relating to their group identifiers, complete lists can be formed based upon a specific team, club, medical condition, class, grade, school, or district.

As shown in FIG. 13, using these lists, school officials can quickly broadcast messages to the parents of all students in an entire group. The official first logs into the system with a user identification and password, such that the user identifier associated with this information will determine the permissions that the particular official has. If the official is permitted to create his or her own lists, the official may only be permitted to create certain types of lists according to his or her permissions, and thus, the official may be presented with the option of selecting from all the lists that the official has created. In other embodiments, the permissions associated with the user identifier for the official will establish which of a number of lists are available for the official's use, which may, for example, be presented in a "Select A List" drop down menu.

The sender can input or select various items, including the sender's name, an email address (which may be used for tracking of the messages, as further explained below), and a header or subject line. The user will then select a prefabricated message—such as, for example, a standard two-hour delay message—or may input a specific message to be communicated. The sender then selects the list(s) that define the groups for which the message will be broadcast.

In certain advantageous embodiments, instead of immediately communicating the message, the user will also be able to schedule the broadcast. Accordingly, messages of a non-critical nature, such as, for example, a monthly reminder about an event, can be scheduled ahead of time. In this way, recurring messages may also be implemented.

Figure 14:
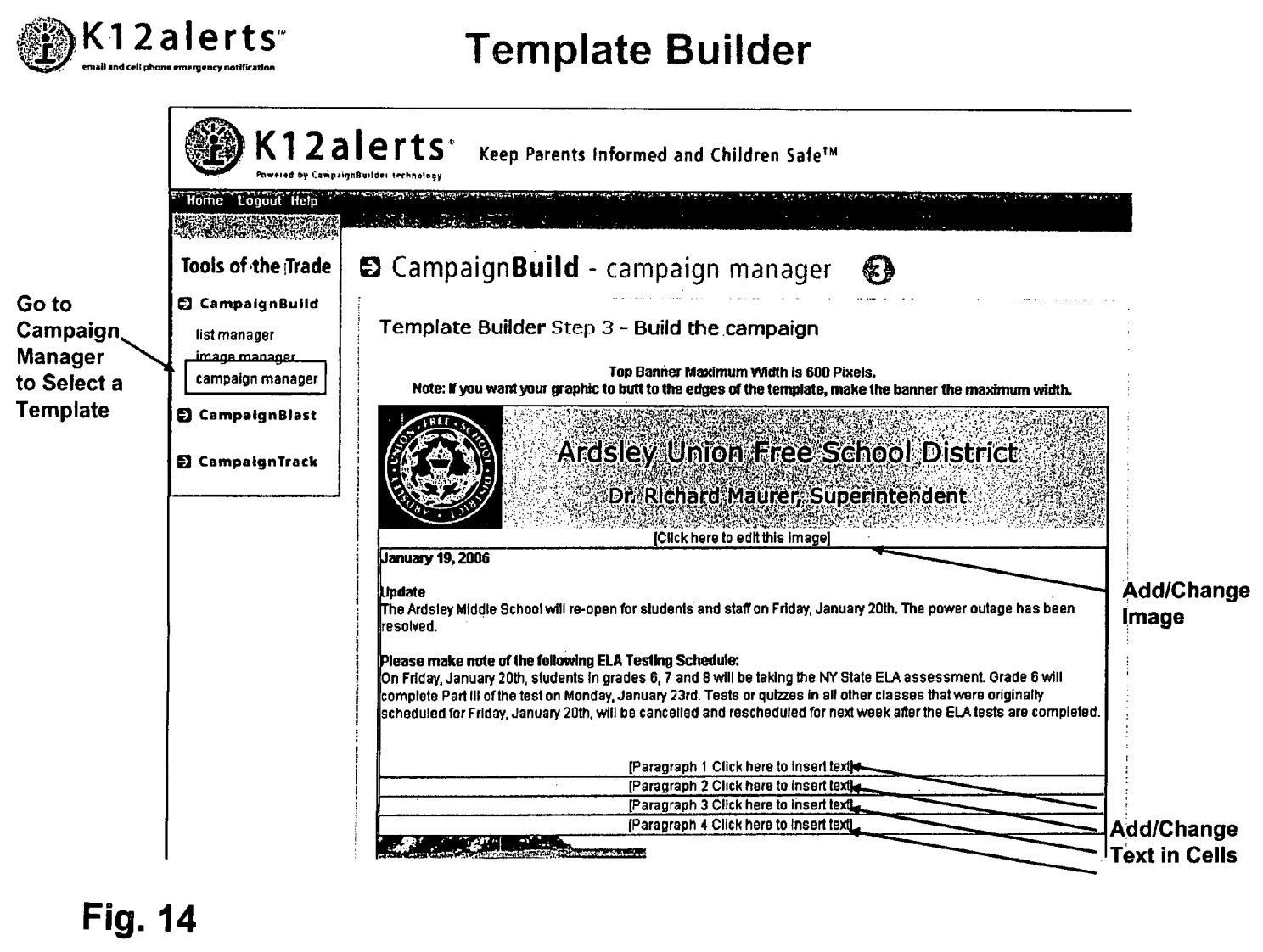
Figure 15:
Figure 16:
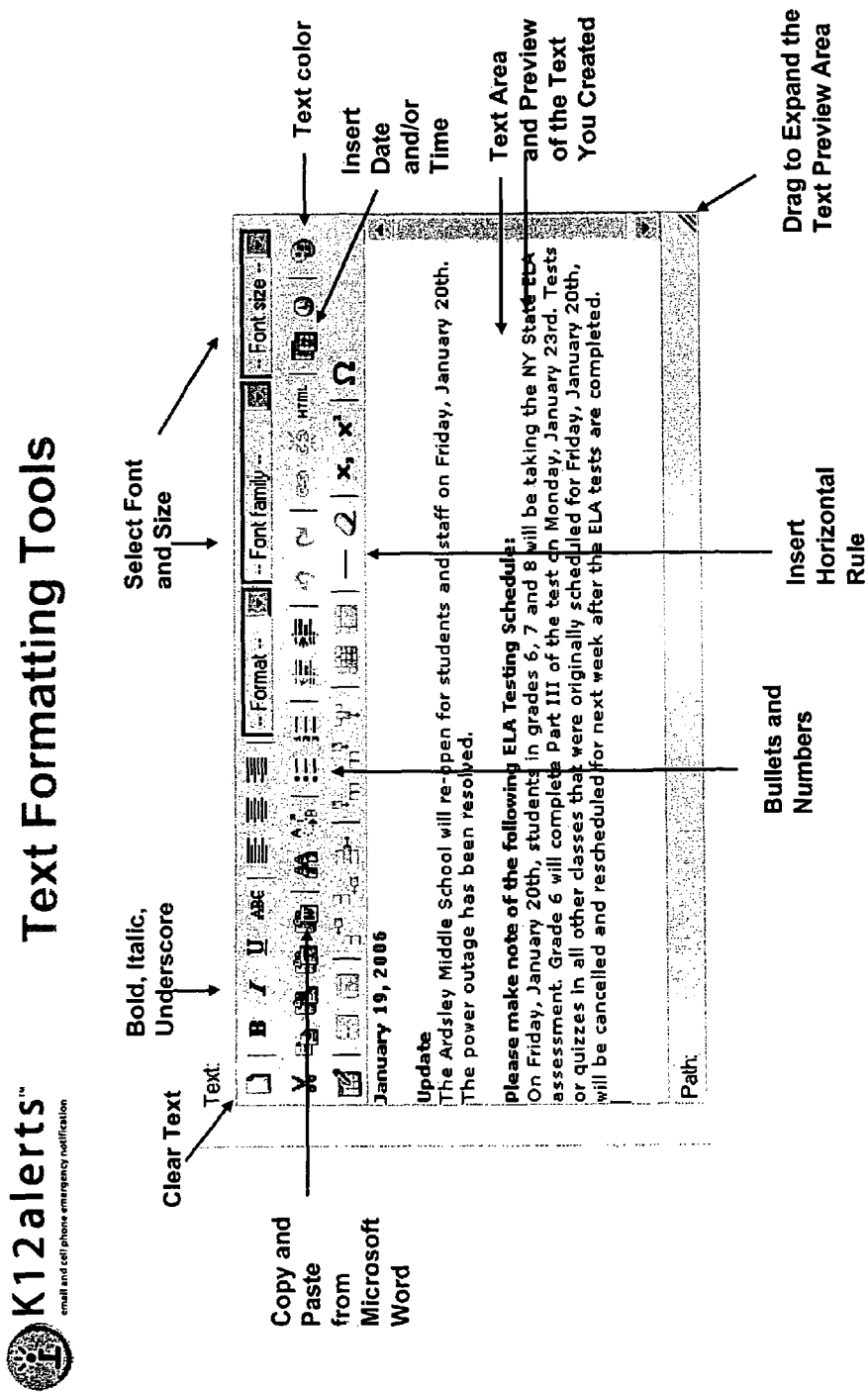
FIG. 16 is a screenshot of the system implemented in FIG. 1 where a user can format the text in a template for an email message.

In some embodiments, a template builder is provided to help users of the system, format, copy, and archive messages. For example, as shown in FIG. 14, a user can select a campaign manager feature in order to generate an email template. With this builder, the user can insert a banner and/or image, and can input, edit, or format standard text to be included in the email message. As illustrated in FIG. 15, an image can be selected from a number of available images and inserted into the template. Similarly, a form could be selected from a number of standard forms. Other standard items can be included in the template, such as a URL, which can be tracked with the system. Additionally, as shown in FIG. 16, text can be inserted and customized to all the standard formatting options similar to those associated with a standard word processing application, such as Microsoft Word.

Figure 17:
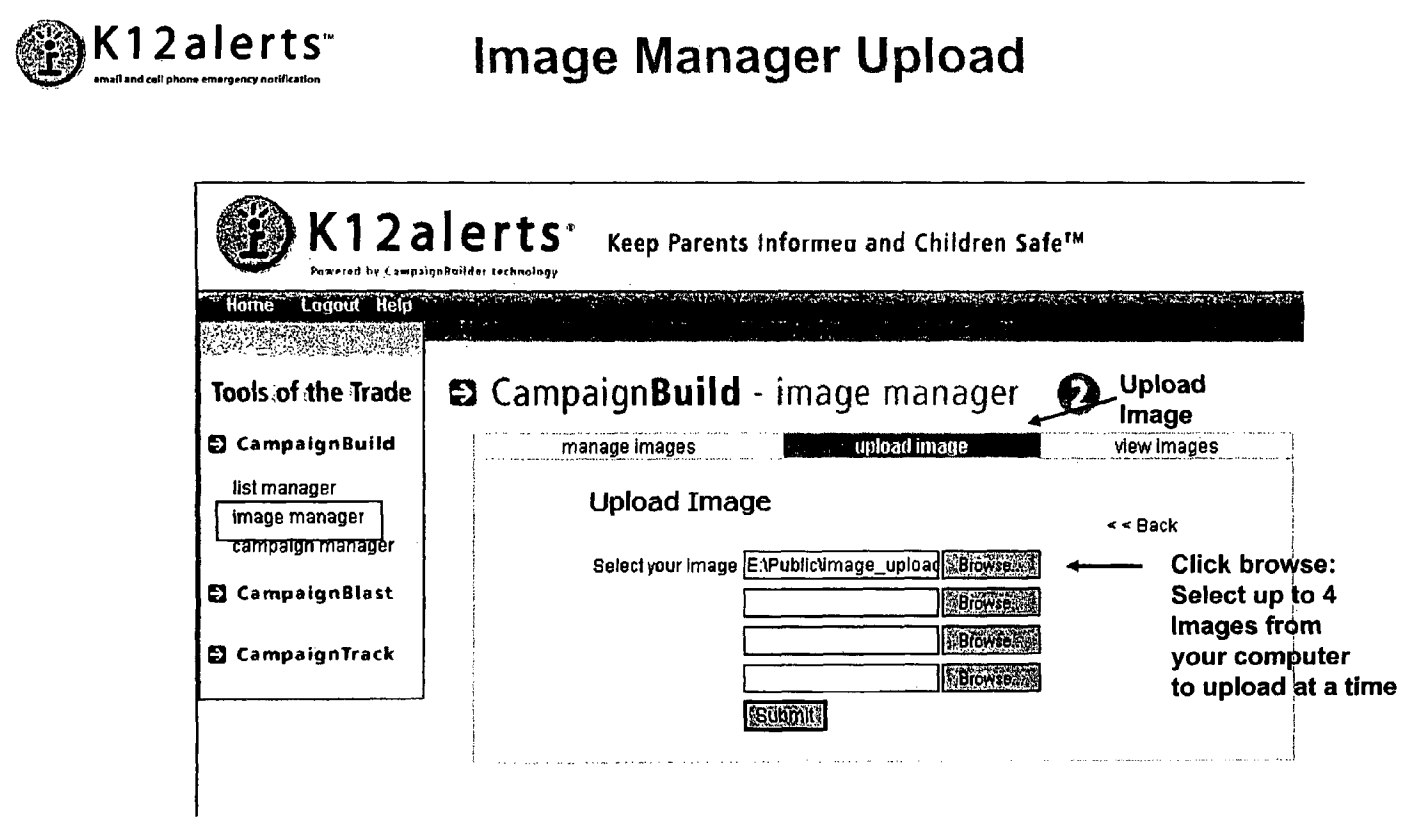
Figure 18:
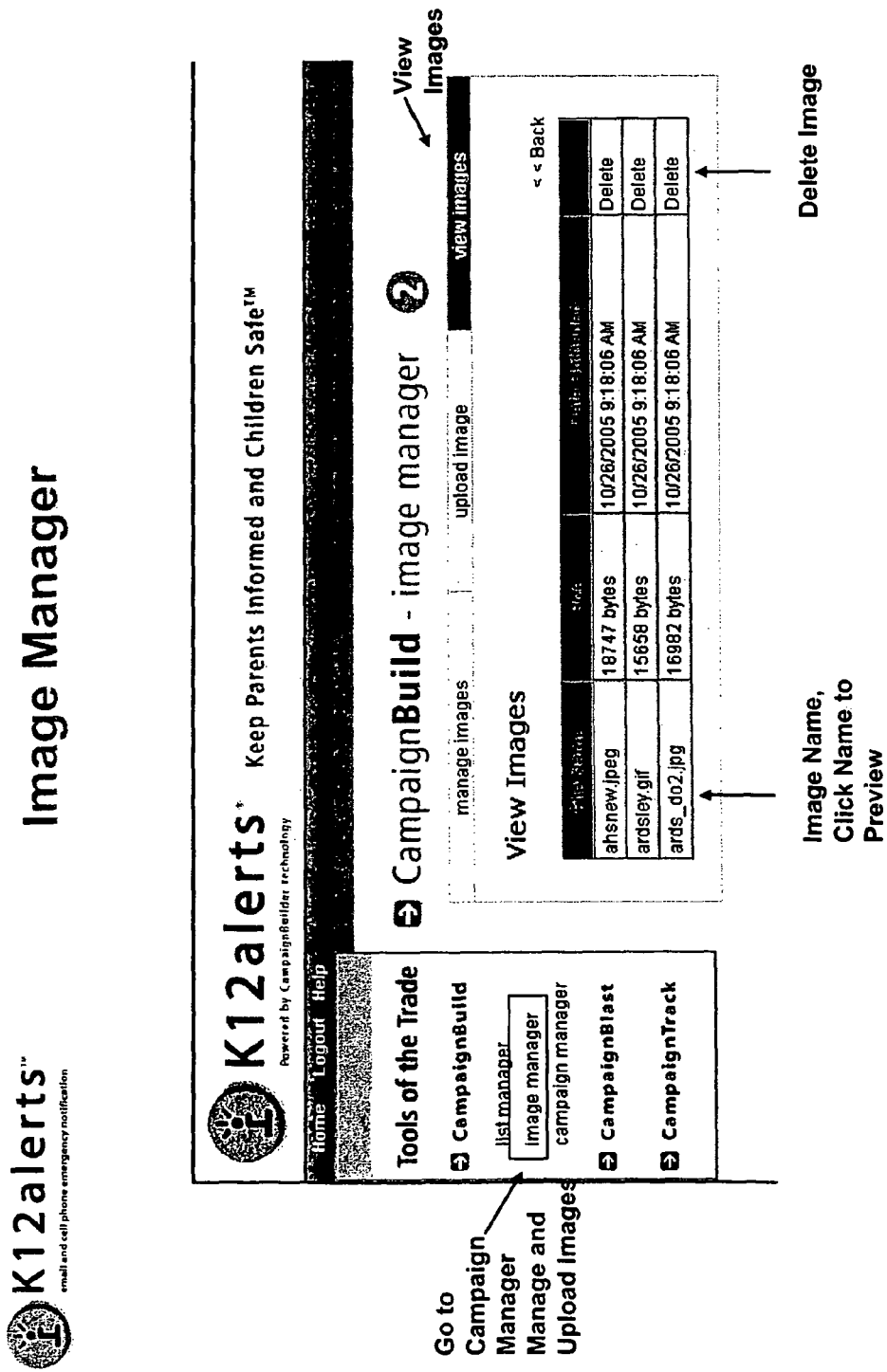
FIG. 18 is a screenshot of the system implemented in FIG. 1 where a user can manage uploaded images.
Figure 19:
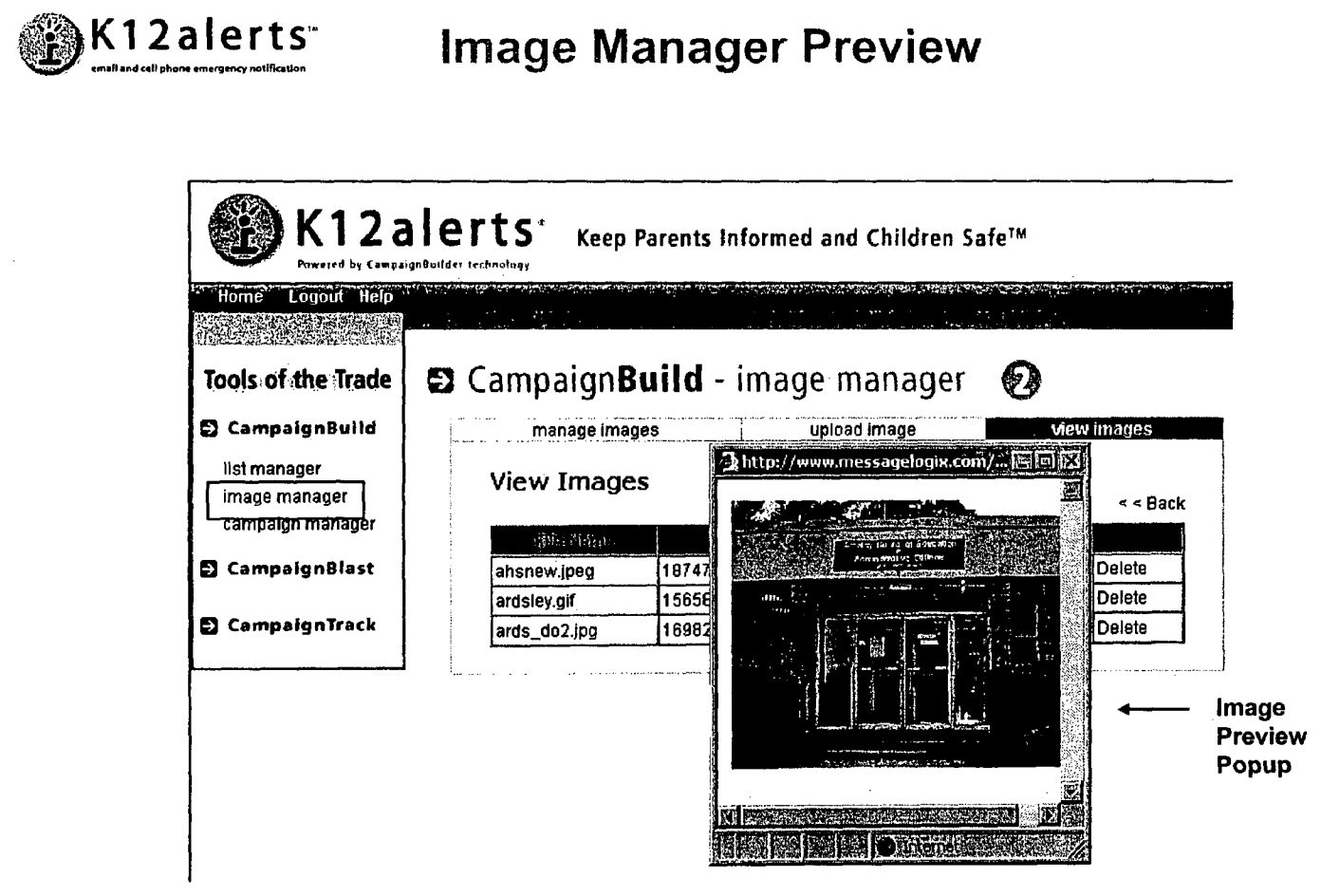

The availability of images to be inserted into the template as described above can be managed with an image manager feature available to the user. As shown In FIG. 17, this feature includes a 'upload image' option, with which the user can locate and upload images from a hard drive or other media. As illustrated in FIG. 18, once uploaded, these images can be sorted, deleted, or viewed using a 'view images' option. By clicking on the file name of an image, one can preview an image in a pop-up window, as shown in FIG. 19.

In some embodiments, the user is provided with canned messages to be edited and customized. These typically include standard messages, such as a school delay, a power outage, a blocked street, or a busing delay.

Figure 20:
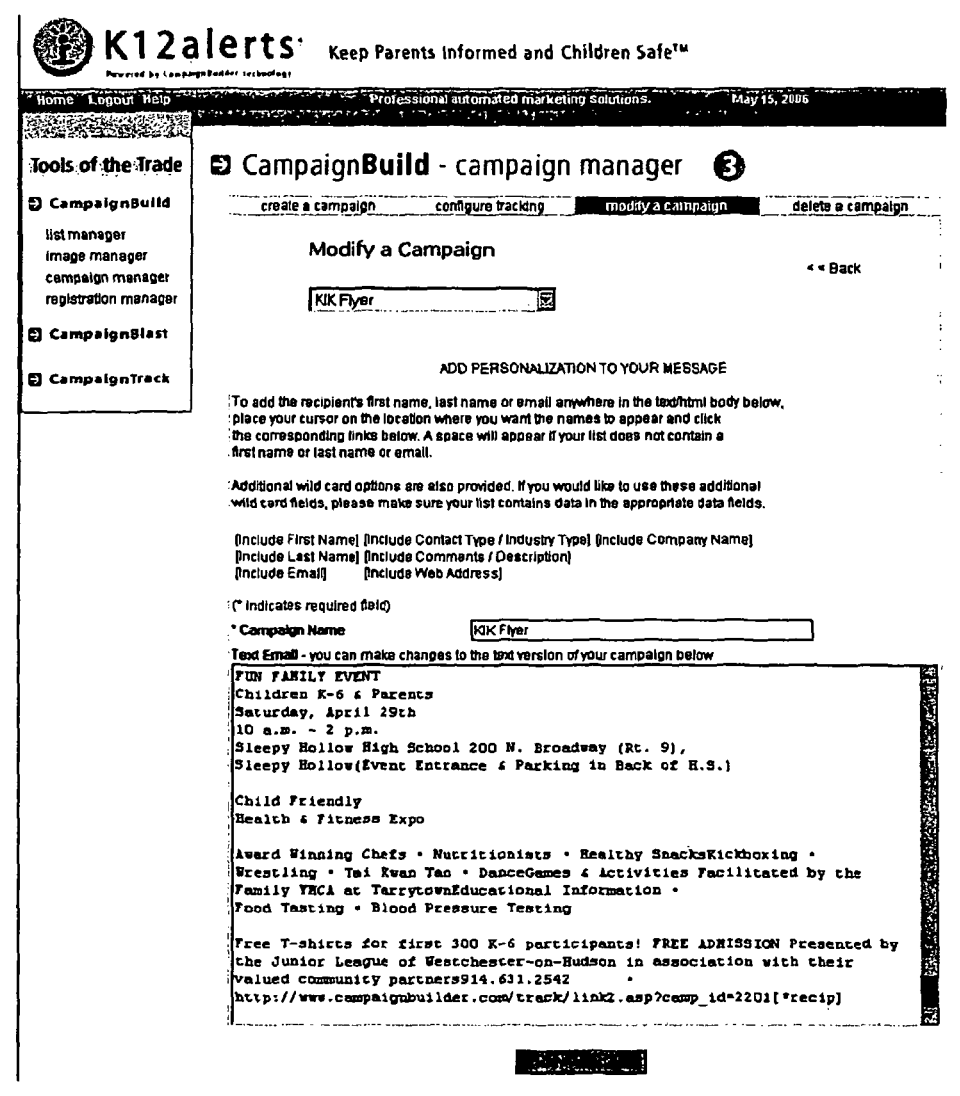
Figure 21:
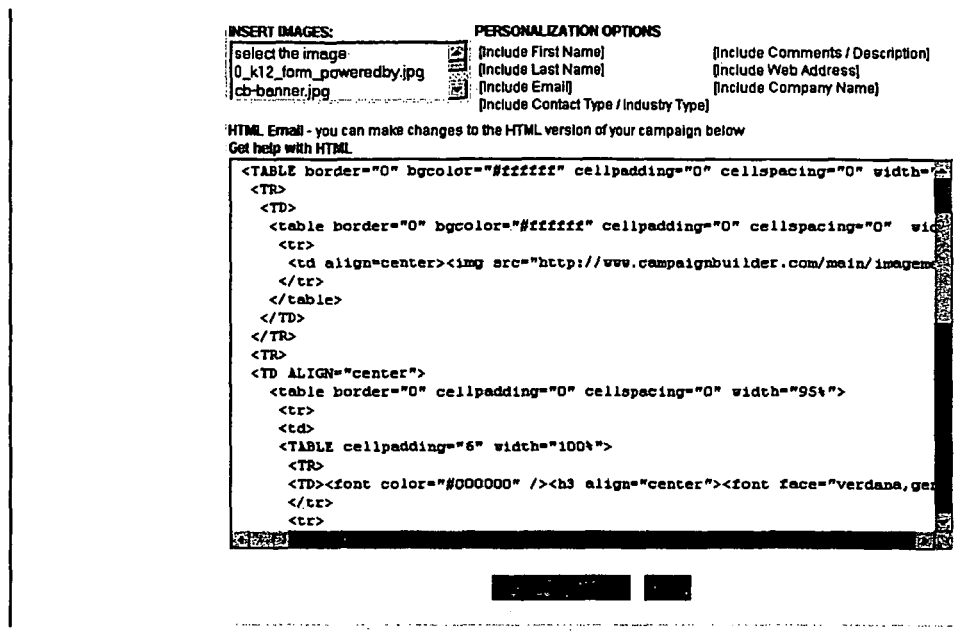

Once templates are formed, they can be easily retrieved and personalized for the recipients using the 'modify a campaign' feature, as illustrated in FIGS. 20-21.

Figure 22:
FIG. 22 is a screenshot of a sample email message created with the system implemented in FIG. 1.

Using the features described above, a user can create appealing templates for messages, such as, for example, the sample coyote alert illustrated in FIG. 22. This type of customized message can be used immediately and then deleted, or can be saved as a template to be used for future messages, such as in cases where the banner, school image, etc., will always be the same, and only the text portion of the email will change. Such templates can be particular useful, for example, for the production of regular school newsletters.

Figure 23:
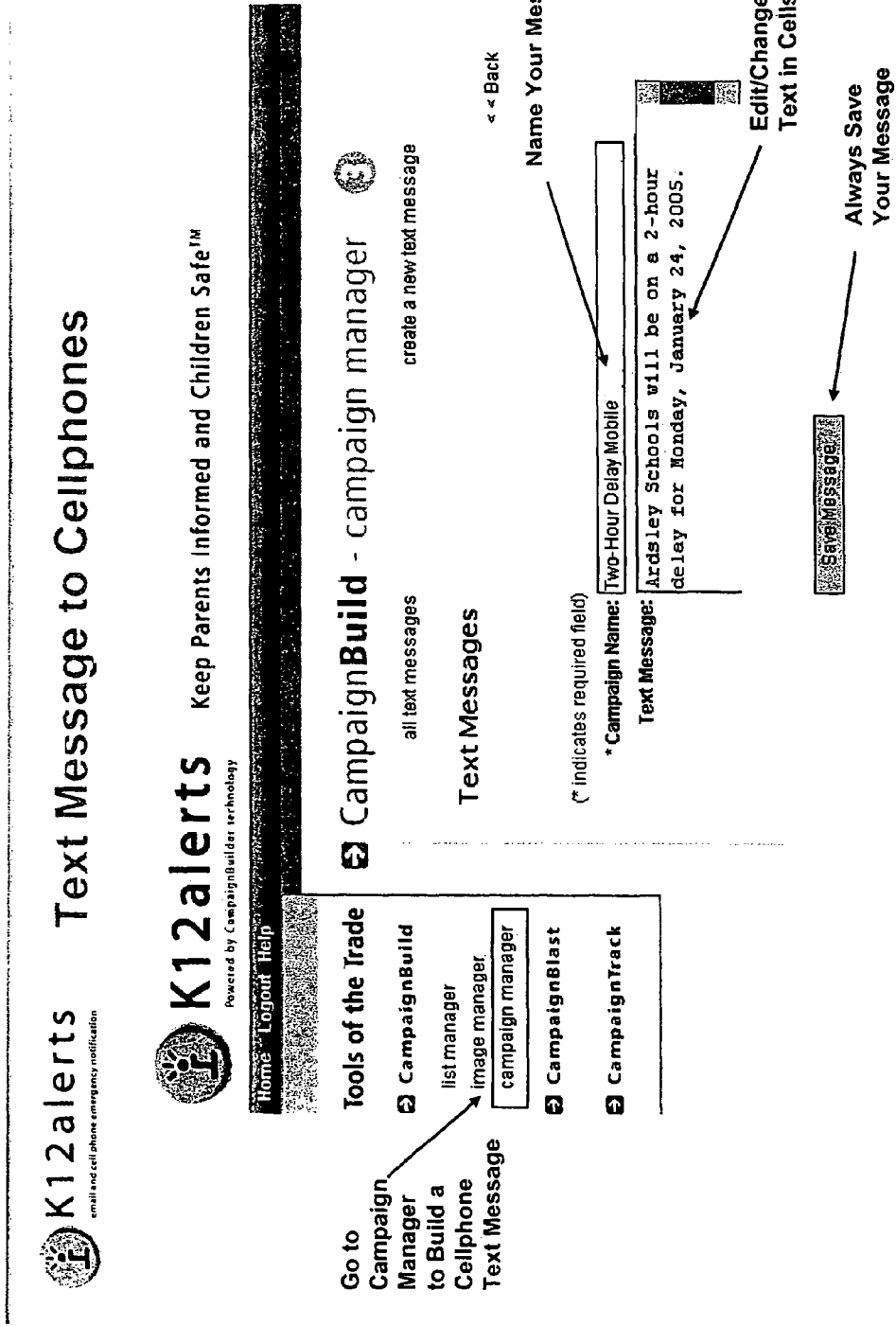
FIG. 23 is a screenshot of the system implemented in FIG. 1 where a user can create a text message.
Figure 24:
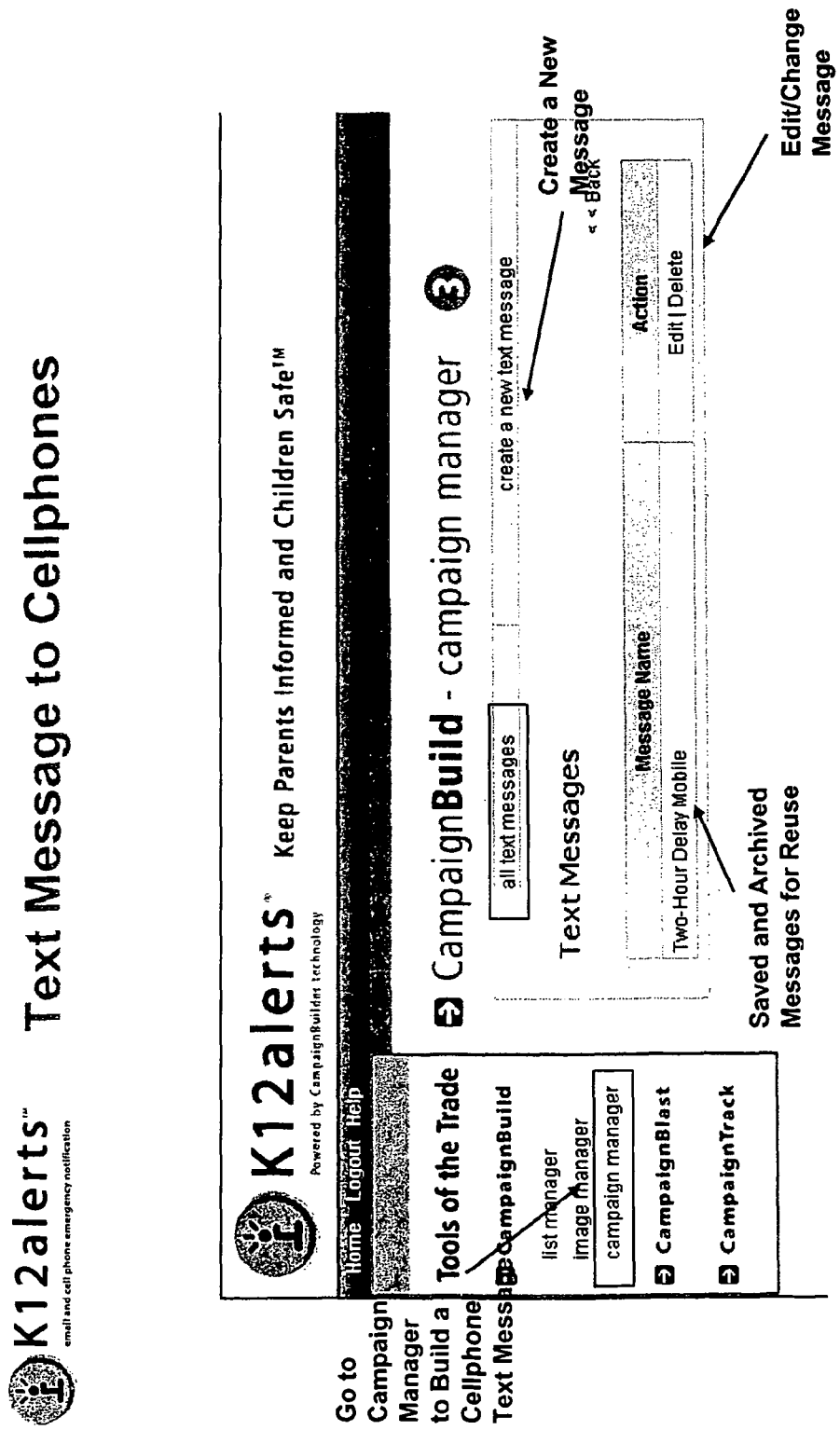
FIG. 24 is a screenshot of the system implemented in FIG. 1 where a user can review, edit, and deleted created text messages.

In a similar fashion, the campaign manager feature can be employed to build text messages. As illustrated in FIG. 23, a simple message can be created for delivery, for example, to a cell phone. As shown in FIG. 24, these messages can be saved and archived for future use.

In some advantageous embodiments, the system receives and records recipient data reflecting the success of the attempted delivery of information to the intended destinations. As noted above, such information may be supplied to the sender's email address, or may be provided in the form of reports maintained on the server 102 and accessible to a user upon logging in to the system with appropriate identification information.

Figure 25A:
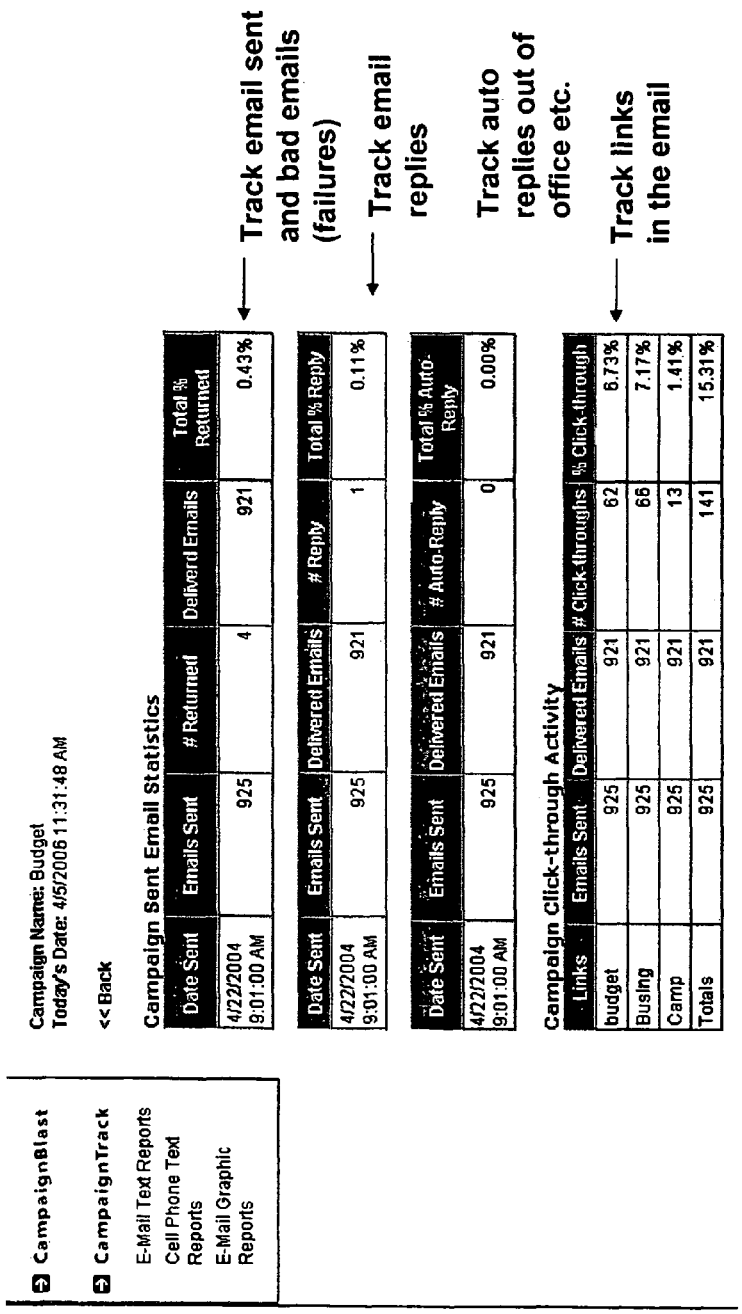
Figure 26B:
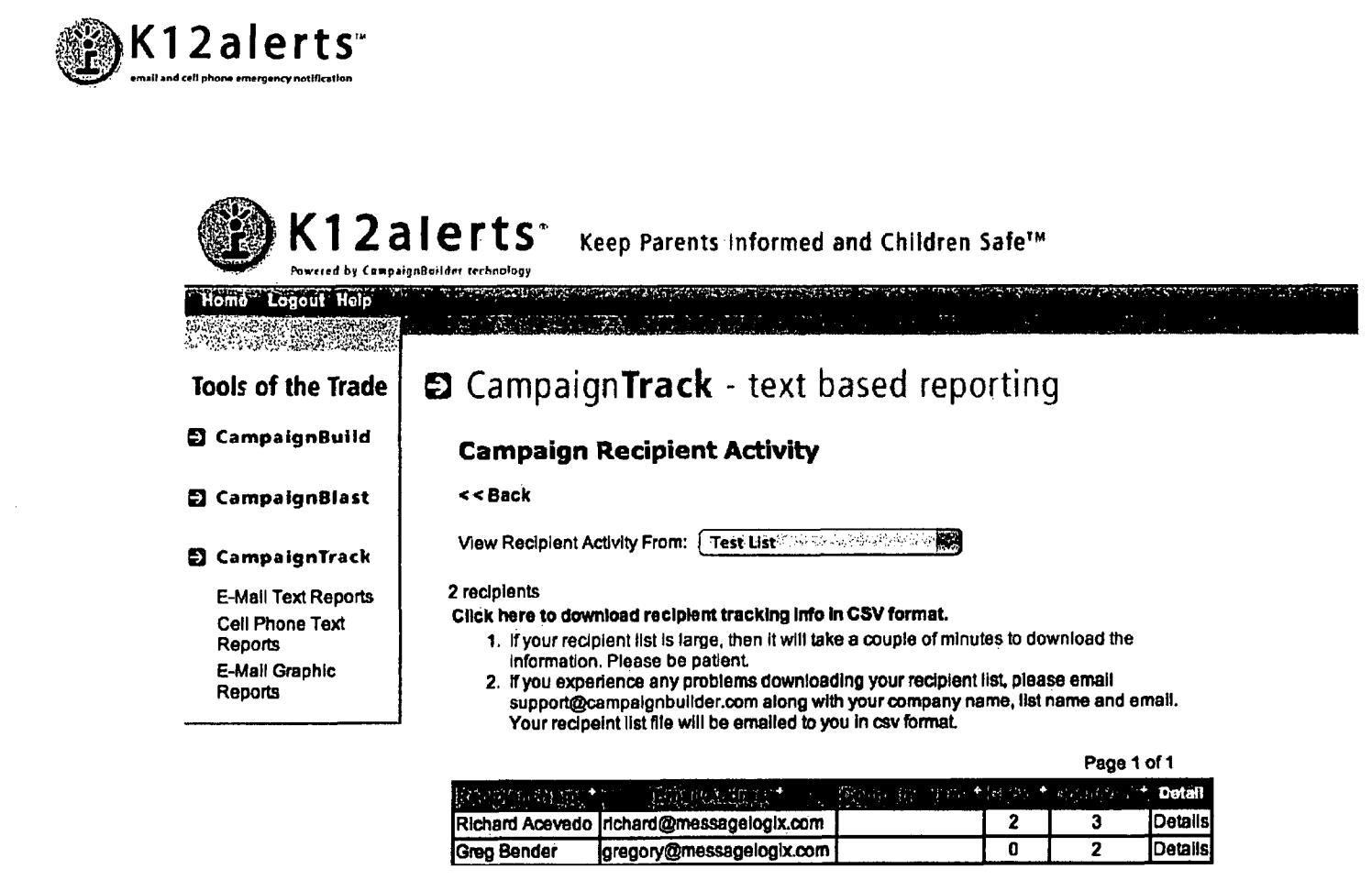
Figure 27C:

As shown in FIGS. 25A-C, the recipient data will indicate how many of the broadcast messages were successfully delivered to their intended destinations. For example, the data may inform the user exactly how many emails were bounced, and which specific ones. As illustrated in FIGS. 26A-B, in the case of email, the recipient data may further include information indicating whether the email was read by the recipient. Such information can prove very useful, both for insuring that important messages are received by all parents in emergency information, as well as for liability purposes in the even an unscrupulous parent attempts to claim they did not receive a message that they did, in fact, receive.

Figure 28A:
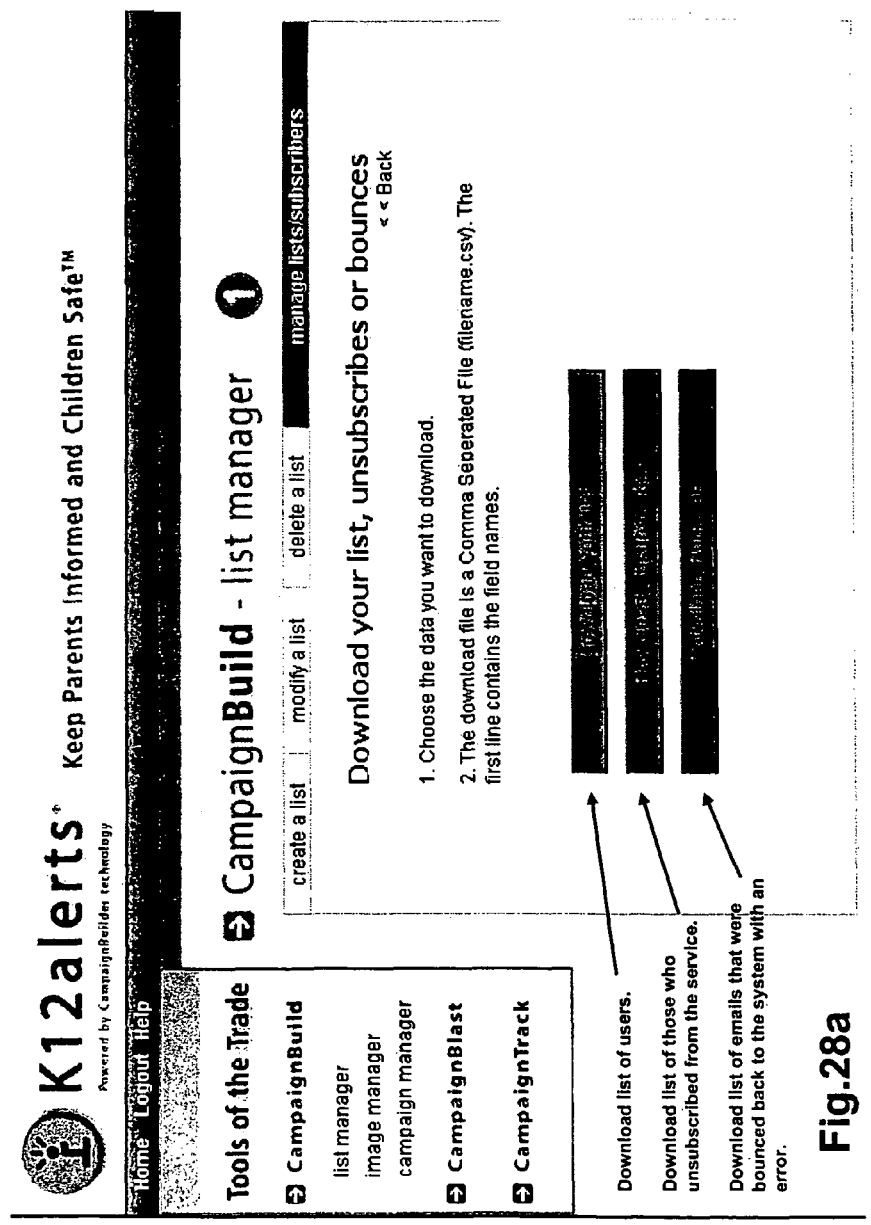
Figure 31:
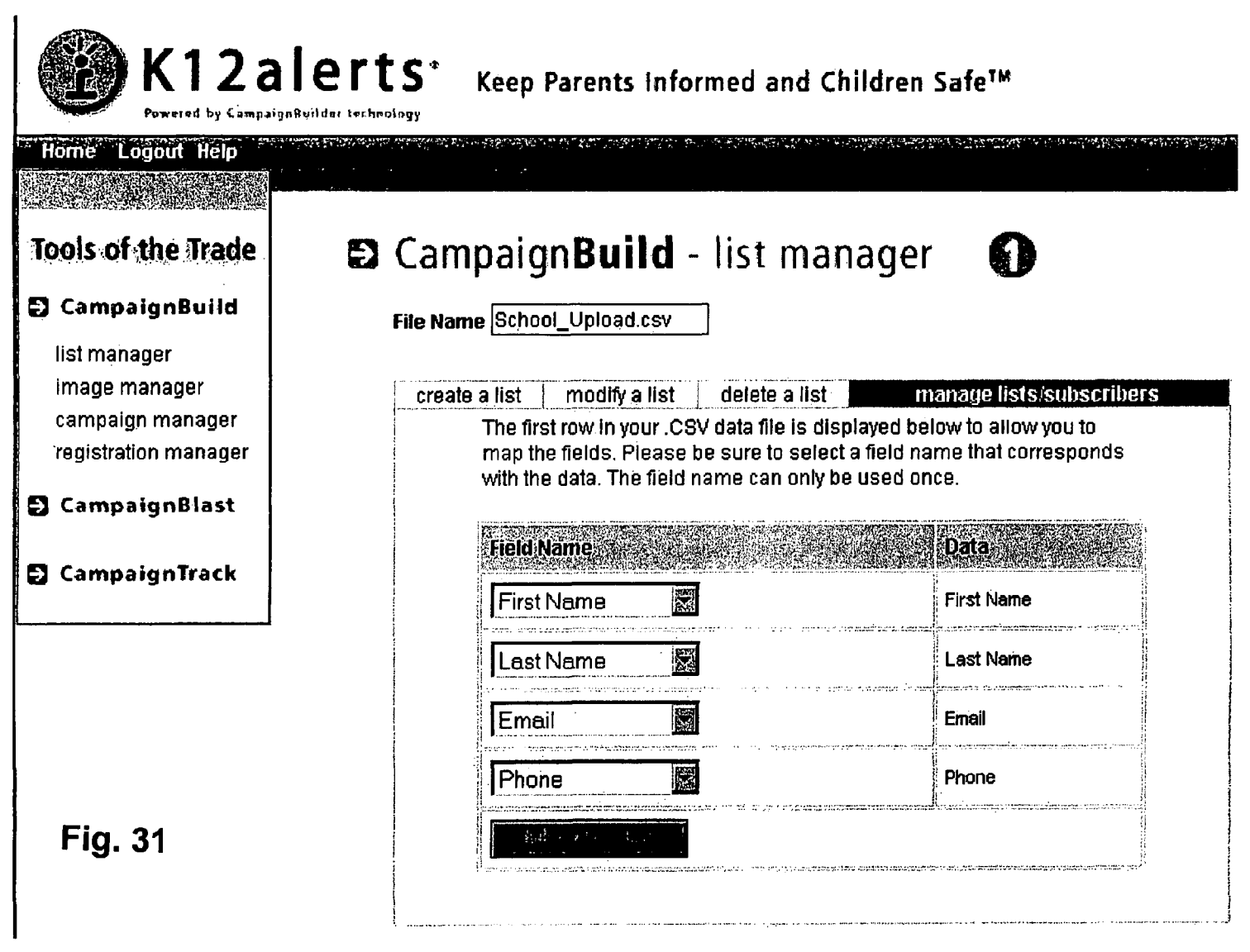

Also, in some embodiments, the 'list manager' feature, in addition to allowing the creation of lists, also facilitates the maintenance thereof. Accordingly, as shown in FIGS. 27A-D, the user can employ an address book and other tools to manage and modify these lists. Additionally, the 'list manager' feature permits the downloading of lists and reports. Accordingly, as shown in FIGS. 28A-B, the list manager can be employed to download a report of the unreceived broadcast messages, including, for example, bounced messages and out-of-office replies. Similarly, other lists can be downloaded, such as a list of user's that have unsubscribed from the notification system, or the group lists that have been created for broadcasting messages to particular groups/subgroups. Likewise, in some embodiments, the list manager feature can be employed to upload files, as shown in FIGS. 29-31.

Figure 32:
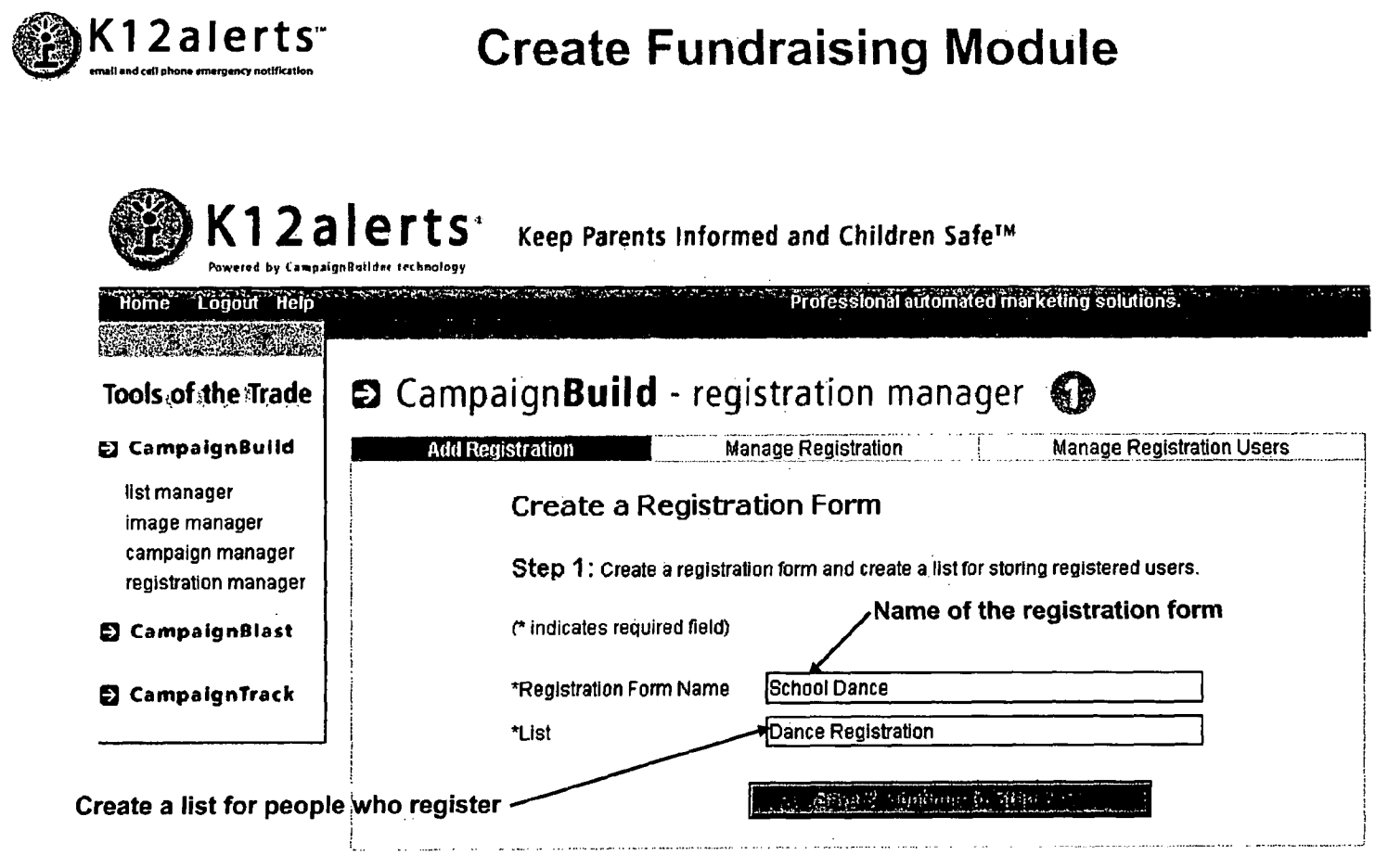
Figure 33:
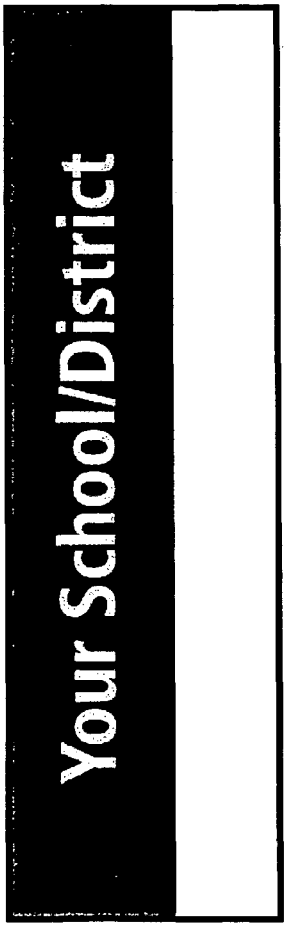
Figure 34:
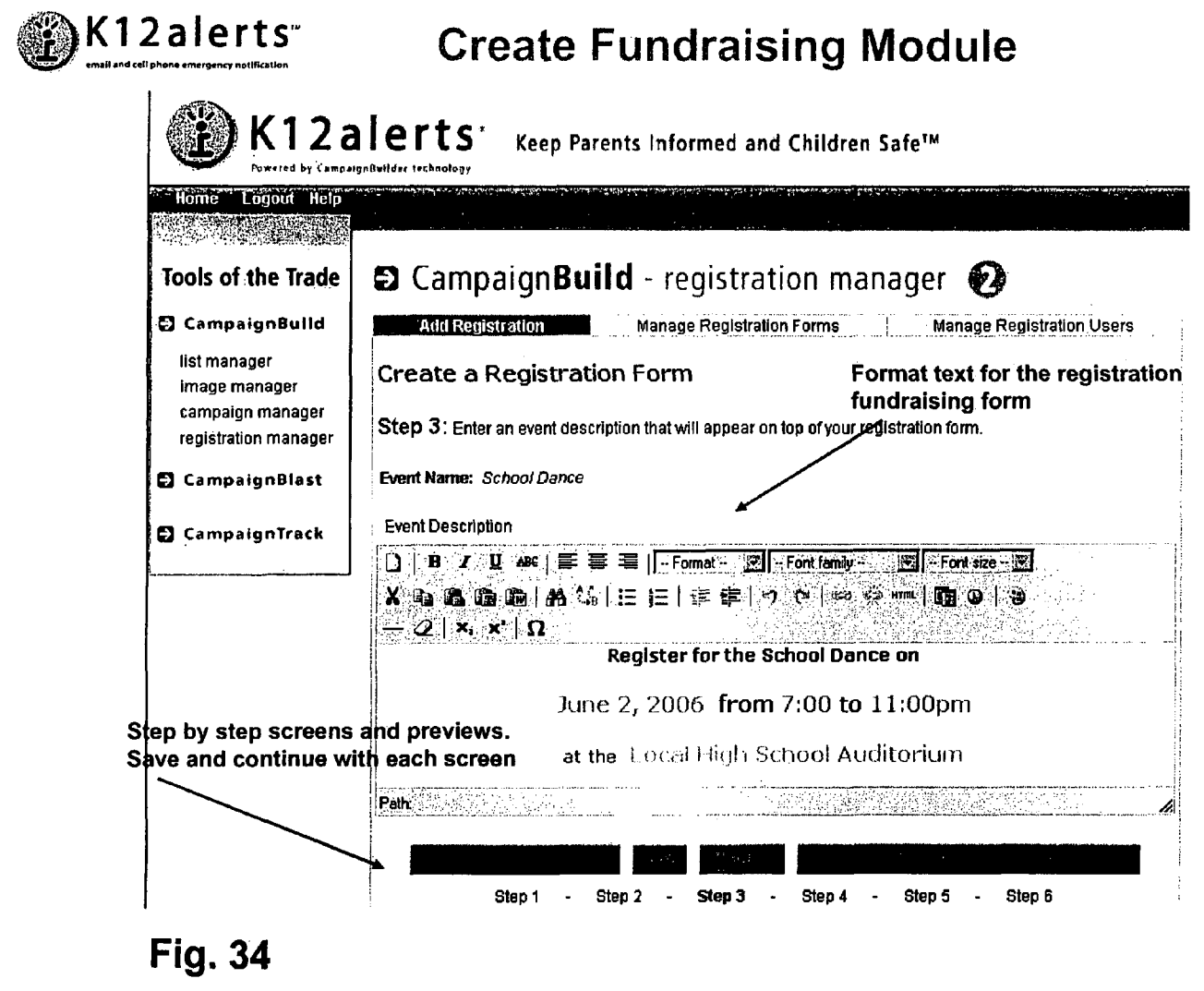
Figure 36:
Figure 37:
Figure 39:

In some embodiments, the above described messaging system can be integrated with a fundraising module that facilitates the creation of fundraising forms. As illustrated in FIGS. 32-34, the user can build and format such forms in a manner similar to that previously described. As shown in FIGS. 35-37, these forms can be designed to capture credit card, electronic payment (such as Paypal), or other payment information, and as shown in FIGS. 38-39, auto-response messages can be created and set to be communicated to a registrant upon completion of the form. As illustrated by FIGS. 40-41, predetermined fields can be selected to appear on the registration page. Access to the registration form can be implemented in various ways, such as, for example, embedding it in an email or providing a hyperlink to a web page containing the form.

Additionally, the system includes the storage of student data for each student, such that important student information can be obtained in emergency situations. This student data, which is stored on the server 102, is entered and updated by a parent guardian who must create an account and login to the emergency card system via a login screen, shown in FIG. 42.

After logging in, the user can enter general identification information for the student, as shown in FIG. 43. Referring to FIG. 44, the user can then add information about parents and/or guardians. As Illustrated in FIG. 45, if the parent wishes do so, the parent can identify a parent 'surrogate' who is authorized to take custody of the child.

Figure 49:

In certain advantageous embodiments, the user can add medical information for the child, which can include any relevant information that may be useful in a medical situation, such as known allergies or history of illnesses. As shown in FIG. 46, the medical data can include a doctor's or a dentist's identity and contact information. In addition to particular fields to be input or selected, the system may further include the ability to enter general notes about the student. Due to the sensitive and critical nature of this information, in some embodiments, a confirmation screen, and a security code for making changes, are also provided as shown in FIGS. 47-49, and a student ID number may be provided for use by a parent to identify their children, as shown in FIG. 50.

Figure 51:
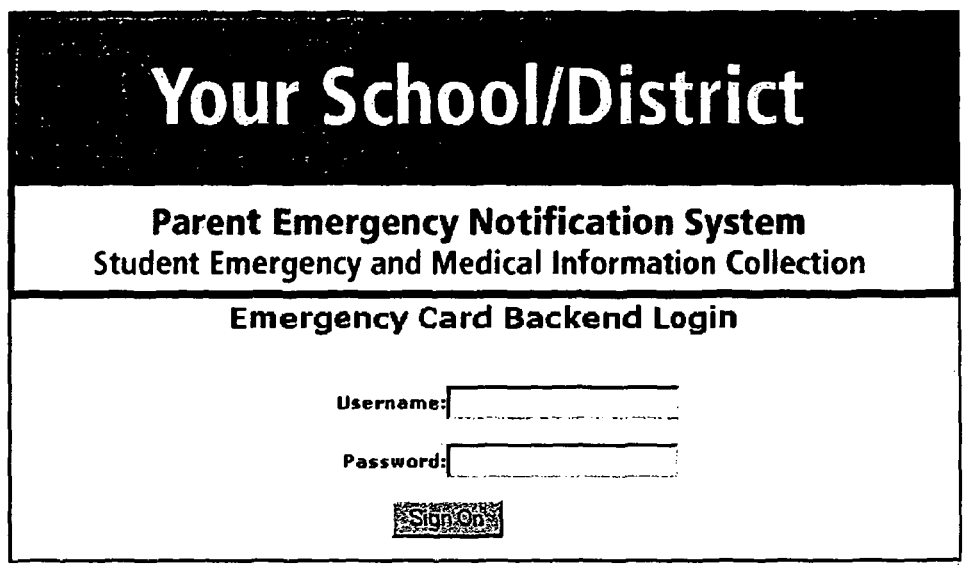

As shown in FIG. 51, a login screen is provided for school administrators and personnel in order to access this information. The user logs into the system with a user identification and password, such that the user identifier associated with this information will determine the permissions that the particular user has. The user can conduct search by student name and, based on his or her permissions, will be able to access the student data for those students that have group identifiers that match the group identifiers associated with the user's user identifier. In this way, teachers can access important student information, such as medical information, which could, for instance, be downloaded to a wireless handheld device if a student is injured or has an allergy attack on a field trip. Similarly, a teacher could download emergency contact information for the student's parents.

Likewise, team physicians and coaches can access important health information when needed, and medical records could even be downloaded to a PDA or portable computer. Because the access to this student data is based on the permissions granted by the group identifiers, a soccer coach, for example, would have access to the records of the members of his team, as these team members would have the appropriate group identifier associated with their data. However, the coach would not be able to access the private information of other students. A school nurse, on the other hand, may have access to the student data for all the students that are in her school, all of whom would have a group identifier associated with their data that identifies the school as the group.

Figure 53:
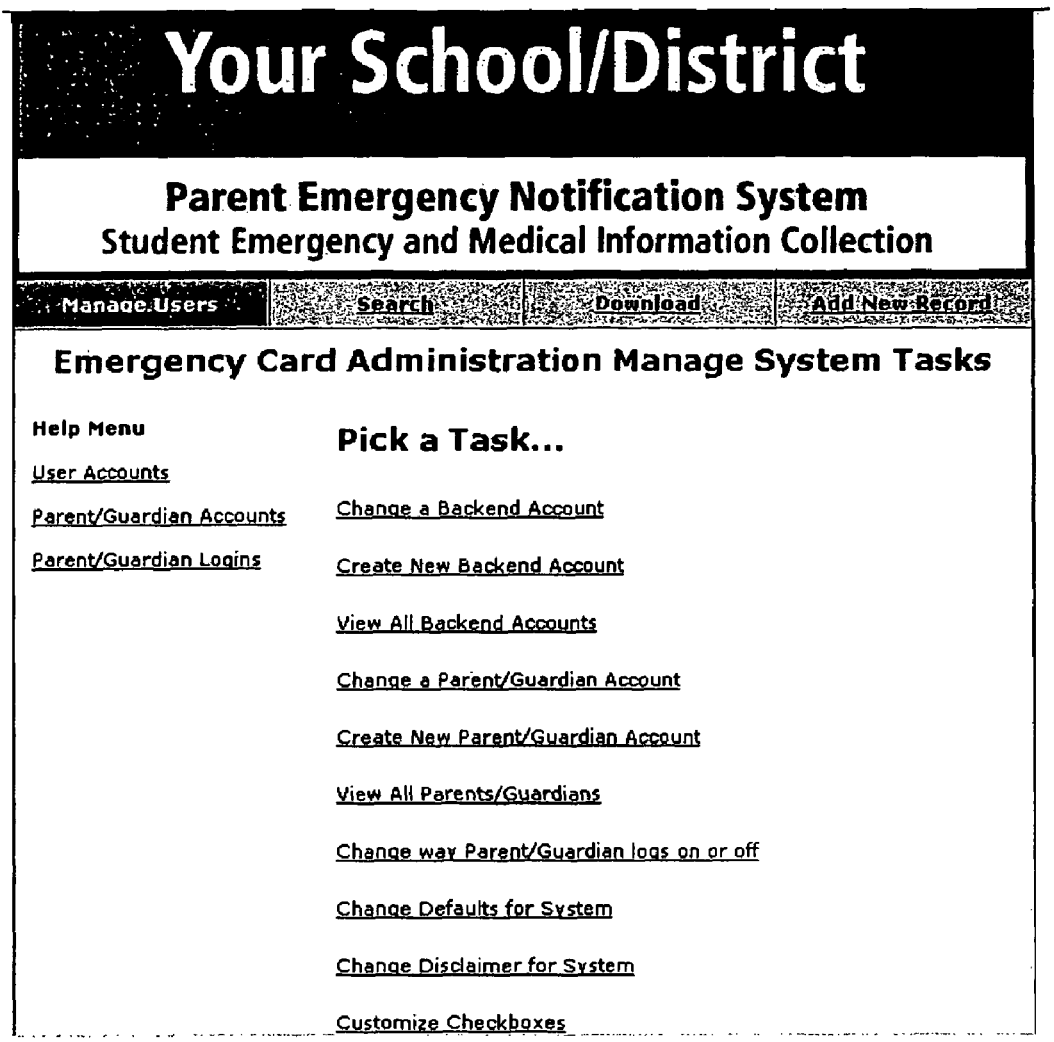
Figure 56:
Figure 59:
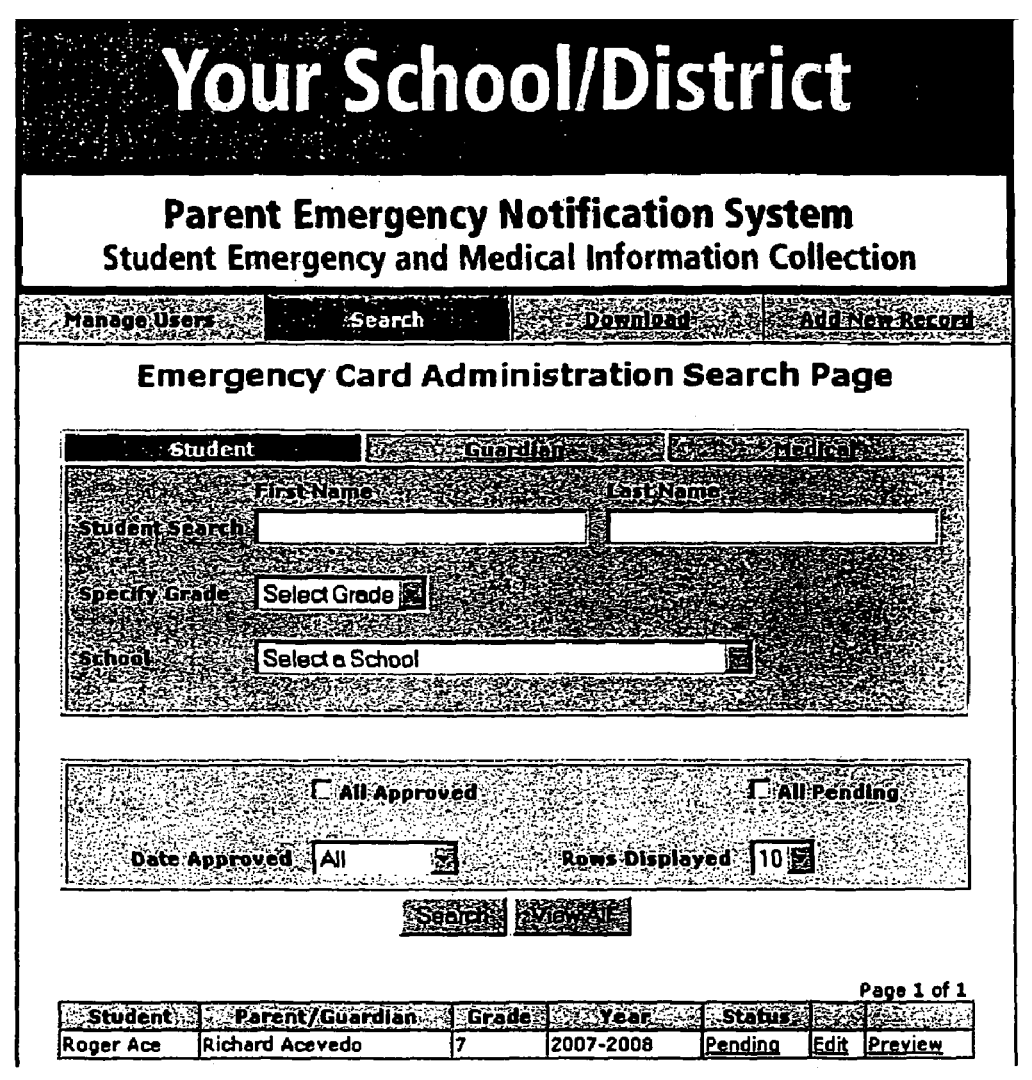
Figure 61:
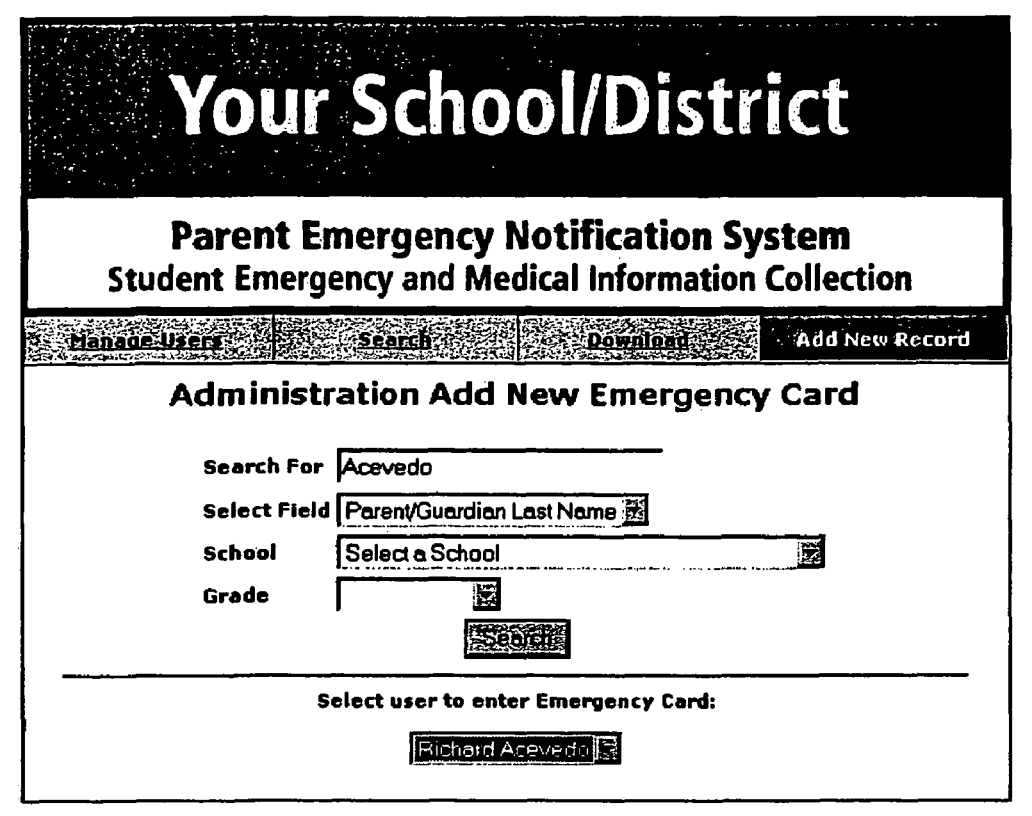

As shown in FIG. 52, school officials may have various levels of authority, some of which will have only viewing and/or downloading capabilities. However, as illustrated in FIG. 53, a variety of tasks are available, which depends on upon the level of the user's authorized access. In certain cases, some administrators may be able to utilize a number of these features, as shown in FIG. 54-61, including the creation and editing of student data, and controlling the access of both parents and school officials to access or edit certain data.

Additionally, in some embodiments of the invention, the student data is uploaded to a school database for storage thereon. Accordingly, when a student switches schools, such as when going from grammar school to junior high or when switching from a public school to a private school, the information can be transferred to a database located at the new school. Similarly, in some cases, this information can be directly transferred between officials in different schools by creating a PDF (or other appropriate format) document (from the medical transcript, for instance) and transferring this document between two officials having the necessary permissions.

Due to the large amount of information that is collected and stored concerning students, large repositories of historical data are accumulated, which can be used for research and historical analysis in order to report on health, emergency, or other conditions within a school, district, or state. For example, an analysis could be quickly performed concerning how many children are typically allergic to peanut butter in schools with ages ranging from 1-10 years-old. Similarly, because of the broadcasting capabilities of the system, large amounts of information can be quickly collected from parents for polling and/or surveys.

It should be understood that while many features of a system for the management of student information have described and illustrated, not all features are necessary for a successful implementation of the system. It should be noted that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method of sending an emergency notification using student information, comprising:

storing communication data of a parent or legal guardian for each one of a plurality of students;

associating at least one of a plurality of group identifiers with the stored communication data for each of the plurality of students, wherein each of the group identifiers identifies a group of students;

storing a plurality of sender identifiers, wherein each sender identifier identifies a particular sender of student information;

associating with each sender identifier at least one of the plurality of group identifiers, wherein each of the group identifiers associated with a particular sender identifier identifies a group for which the particular sender identified by the particular sender identifier is authorized to send student information;

receiving a sender identifier via a user input and, in response thereto, retrieving all of the group identifiers associated with the received sender identifier; and communicating student information to a parent or legal guardian of all particular students having a group identifier associated therewith that is also a group identifier that is associated with the received sender identifier using the communication data of a parent or legal guardian stored for the particular student;

wherein fewer than all members of a group are authorized to send the emergency notification to other members of the group; and wherein at least some of the plurality of sender identifiers are not associated with at least some of the plurality of group identifiers.

2. The method of claim 1, further comprising the step of receiving a selection command from the user, wherein the selection command selects at least one group identifier from among a plurality of group identifiers associated with the received sender identifier, and wherein the step of communicating comprises communicating the student information only to groups associated with selected group identifiers.

3. The method of claim 1, wherein the step of communicating comprises communicating student information to more than one destination corresponding to the parent or legal guardian of a particular student.

4. The method of claim 1, further comprising the step of storing a message supplied by the user, wherein the step of communicating student information comprises communicating the message to a parent or legal guardian of each particular student having a group identifier associated therewith that is also a group identifier that is associated with the received sender identifier.

5. The method of claim 4, wherein the message is created using a template.

6. The method of claim 5, wherein the message is a fundraising registration form.

7. The method of claim 1, further comprising the step of receiving scheduling data, wherein the scheduling data indicates when the student information is to be communicated, and wherein the step of communicating comprises communicating the student information according to the scheduling data.

8. The method of claim 7, wherein the step of communicating the student information according to the scheduling data comprises transmitting recurring messages.

9. The method of claim 1, wherein a first one of the groups is a subgroup of a second one of the groups.

10. The method of claim 9, wherein the group identifier associated with the subgroup identifies a group consisting of students that attend a particular school, are in a particular grade, are in a particular class, have a particular medical condition, are on a particular team, or are in a particular club.

11. The method of claim 1, further comprising the steps of:
receiving recipient data for each destination to which the student information was communicated, wherein the recipient data received for a particular destination indicates whether the information communicated to the particular destination was received; and
recording the received recipient data.

12. The method of claim 11, wherein the received recipient data includes recipient data for student information communicated via electronic mail, wherein the received recipient data for electronic mail further indicates whether the electronic mail has been read.

13. The method of claim 11, further comprising repeating the step of communicating the student information for each particular destination for which the recipient data received therefor indicates that the student information was not received.

14. The method of claim 1, wherein the step of communicating student information comprises communicating text information.

15. The method of claim 14, wherein the communication data comprises at least one of a telephone number and an electronic mail address, and the text information comprises at least one of a text message, a facsimile, and an electronic mail message.

16. The method of claim 1, wherein the step of communicating student information comprises communicating an audible message.

17. The method of claim 16, wherein the communication data comprises a telephone number.

18. A method of sending an emergency notification using student information, comprising:
storing emergency contact information for each one of a plurality of students;
associating at least one of a plurality of group identifiers with the stored emergency contact information for each of the plurality of students, wherein each of the group identifiers identifies a group of students;
storing a plurality of user identifiers, wherein each user identifier identifies a particular user;
associating with each user identifier at least one of the plurality of group identifiers, wherein each of the group identifiers associated with a particular user identifier identifies a group for which the particular user identified by the particular user identifier has access to the emergency contact information;
receiving a user identifier via a user input and, in response thereto, retrieving all of the group identifiers associated with the received user identifier;
receiving a request from the user identified by the received user identifier to retrieve the emergency contact information stored for a particular student and, in response thereto, determining whether the emergency contact information stored for the particular student has a group identifier associated therewith that is also a group identifier associated with the received user identifier; and
providing the user identified by the received user identifier with the emergency contact information stored for the particular student only if the emergency contact information stored for the particular student has a group identifier associated therewith that is also a group identifier associated with the received user identifier;
wherein fewer than all members of a group are authorized to send the emergency notification to other members of the group; and
wherein at least some of the plurality of user identifiers are not associated with at least some of the plurality of group identifiers.

19. The method of claim 18, wherein the emergency contact information comprises communication data.

20. The method of claim 19, further comprising the step of communicating information to a destination corresponding to the particular student using the communication data stored for the particular student.

21. The method of claim 18, further comprising associating medical data with the emergency contact information for each of the plurality of students.

22. The method of claim 18, wherein the emergency contact information comprises doctor identification data.

23. The method of claim 18, wherein the emergency contact information comprises parent surrogate identification data.

24. The method of claim 21, further comprising uploading the medical data to a remote device.

25. The method of claim 24, wherein the step of uploading comprises uploading the medical data to a portable communication device.

26. The method of claim 21, further comprising the step of associating at least one of a plurality of guardian identifiers with the stored medical contact information for each of the plurality of students, wherein each of the guardian identifiers identifies a person authorized to provide the medical data associated therewith.

27. The method of claim 21, further comprising the step of uploading the medical data for each of the plurality of students to a school database for storage thereon.

28. The method of claim 27, wherein the school database is located at a first school, further comprising the steps of:
   deleting the medical data for at least some of the students from the school database at the first school; and
   uploading the deleted medical data to a second school database located at a second school.

29. A method of sending an emergency notification using student information, comprising:
   storing student data for each one of a plurality of students, wherein the student data includes communication data for a recipient;
   associating at least one of a plurality of group identifiers with the stored student data for each of the plurality of students, wherein each of the group identifiers identifies a group of students;
   storing a plurality of user identifiers, wherein each user identifier identifies a particular user;
   associating with each user identifier at least one of the plurality of group identifiers, wherein each of the group identifiers associated with a particular user identifier identifies a group for which the particular user identified by the particular user identifier has access to the student data;
   receiving a user identifier via a user input and, in response thereto, retrieving all of the group identifiers associated with the received user identifier;
   receiving a command from the user identified by the received user identifier to send particular information to all recipients for which communication data is stored for a student having a particular group identifier associated therewith that is also a group identifier associated with the received user identifier; and
   automatically communicating the particular information to a plurality of recipients using the communication data stored for all students having the particular group identifier associated therewith;
   wherein fewer than all members of a group are authorized to send the emergency notification to other members of the group; and
   wherein at least some of the plurality of user identifiers are not associated with at least some of the plurality of group identifiers.

30. The method of claim 18, wherein the emergency contact information comprises contact information for a parent or legal guardian.

* * * * *